United States Patent
Yasuda et al.

(10) Patent No.: US 6,210,858 B1
(45) Date of Patent: Apr. 3, 2001

(54) ANTI-REFLECTION FILM AND DISPLAY DEVICE USING THE SAME

(75) Inventors: Tomokazu Yasuda; Kenichi Nakamura; Taku Nakamura; Kazuhiro Nakamura, all of Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/402,341

(22) PCT Filed: Apr. 4, 1997

(86) PCT No.: PCT/JP98/01576

§ 371 Date: Oct. 4, 1999

§ 102(e) Date: Oct. 4, 1999

(87) PCT Pub. No.: WO98/45734

PCT Pub. Date: Oct. 15, 1998

(30) Foreign Application Priority Data

Apr. 4, 1997 (JP) .................................................. 9-086176
Sep. 18, 1997 (JP) .................................................. 9-253977

(51) Int. Cl.$^7$ ...................................................... G03F 7/004
(52) U.S. Cl. ................................... 430/270.1; 430/271.1; 428/317.9; 428/328; 428/331; 348/834
(58) Field of Search ............................ 430/270.1, 271.1; 428/328, 331, 317.9; 348/834

(56) References Cited

U.S. PATENT DOCUMENTS

| | | | |
|---|---|---|---|
| 4,374,158 | 2/1983 | Taniguchi et al. | 427/41 |
| 5,281,893 | * 1/1994 | Matsuda et al. | 313/478 |
| 5,770,306 | * 6/1998 | Suzuki et al. | 428/328 |

FOREIGN PATENT DOCUMENTS

| | | |
|---|---|---|
| 0 656 258 | 6/1995 | (EP) . |
| 56-84729 | 7/1981 | (JP) . |
| 58-63729 | 4/1983 | (JP) . |
| 59-50401 | 3/1984 | (JP) . |
| 60-92850 | 5/1985 | (JP) . |
| 63-4201 | 1/1988 | (JP) . |
| 1-210433 | 8/1989 | (JP) . |
| 1-298301 | 12/1989 | (JP) . |
| 3-238740 | 10/1991 | (JP) . |
| 4-82145 | 3/1992 | (JP) . |
| 4-155732 | 5/1992 | (JP) . |
| 6-3501 | 1/1994 | (JP) . |
| 6-155652 | 6/1994 | (JP) . |
| 6-331802 | 12/1994 | (JP) . |
| 8-118557 | 5/1996 | (JP) . |
| 8-211202 | 8/1996 | (JP) . |
| 8-244178 | 9/1996 | (JP) . |
| 9-222503 | 8/1997 | (JP) . |

OTHER PUBLICATIONS

Harcourt Academic Press Dictionary of Science and Technology internet website definition of porosity.*
Merriam–Webster's Collegiate Dictionary internet website definition of porosity.*
JP 8244178 A, Sep. 1996, English Abstract.*
JP 6–331802 A, Dec. 1994, English Abstract.*
JP 4–82145 A, Mar. 1992, English Abstract.*
JP 1–298301 A, Dec. 1989, English Absract.*
Derwent abstract of JP 08–244178, Sep. 1996.*
Derwent abstract of JP 6–331802, Dec. 1994.*
Derwent abstract of JP 9–222503, Aug. 1997.*

* cited by examiner

Primary Examiner—Cynthia Hamilton
Assistant Examiner—Rosemary Ashton
(74) Attorney, Agent, or Firm—Burns, Doane, Swecker & Mathis, LLP

(57) ABSTRACT

An anti-reflection film comprises a high refractive index layer having a refractive index of 1.65–2.40, and a low refractive index layer having a refractive index of 1.20–1.55. Another anti-reflection film comprises only a low refractive index layer having a refractive index of 1.20-1.55. In the invention, the first improvement resides in a high refractive index layer composed of inorganic fine particles having a mean particle size of 1–200 nm in an amount of 5–65 vol. % and a crosslinked anionic polymer in an amount of 35 to 95 vol. %. The second improvement resides in a low refractive index layer composed of inorganic fine particles having a mean particle size of 0.5–200 nm in an amount of 50–95 wt. % and a polymer in an amount of 5–50 wt. %, and two or more of those particles are piled up to form micro voidsby the adjacent particles.

9 Claims, 1 Drawing Sheet

ANTI-REFLECTION FILM AND DISPLAY DEVICE USING THE SAME

FIELD OF THE INVENTION

The present invention relates to an anti-reflection film comprising a high refractive index layer and a low refractive index layer, an anti-reflection film comprising a low refractive index layer, and a display device using the anti-reflection film.

PRIOR ART

Anti-reflection films are used in various display devices such as a liquid crystal display device (LCD), a plasma display panel (PDP), an electroluminescence display (ELD), and a cathode-ray tube (CRT). Further, they are generally provided on lenses of glasses or cameras.

As the anti-reflection film, a multi-layered film comprising plural transparent metal oxide layers superposed one on another has been widely employed. The plural transparent metal oxide layers reduce reflections of light in a wide wavelength region, and are formed by chemical vapor deposition (CVD) process or physical vapor deposition (PVD) process (especially, vacuum deposition process). Although the transparent metal oxide layers give an anti-reflection film having excellent optical characteristics, the deposition process has insufficient productivity for mass-production.

In place of the deposition process, it is proposed to employ a coating liquid containing inorganic fine particles to prepare an anti-reflection film.

Japanese Patent Publication No. 60-59250 describes an anti-reflection film comprising fine holes and inorganic fine particles. The film is formed by using a coating liquid, and the formed film is subjected to active gas treatment. By the treatment, the gas escapes from the film to form the fine holes.

Japanese Patent Provisional Publication No. 59-50401 describes an anti-reflection film comprising a support, a high refractive index layer and a low refractive index layer superposed in order. This publication also discloses an anti-reflection film further comprising a middle refractive index layer provided between the support and the high refractive index layer. In each film, the low refractive index layer is formed by using a coating liquid containing a polymer or inorganic fine particles.

Japanese Patent Provisional Publication No. H2-245702 discloses an anti-reflection film comprising two or more kinds of micro particles (for example, $SiO_2$ and $MgF_2$). The mixing ratio of the particles varies in the thickness direction so that the refractive index would gradually vary in the thickness direction. The film having that structure has optical characteristics similar to those of the film in No. 59-50401, which comprises both high and low refractive index layers. In the film of Publication No. H2-245702, the micro particles are combined via $SiO_2$ formed by thermal decomposition of ethyl silicate. In the thermal decomposition, the ethyl part of ethyl silicate is burnt to evolve carbon dioxide and water vapor. The produced carbon dioxide and water vapor escape from the film to form voids by the adjacent micro particles (as shown in FIG. 1 of the publication).

Japanese Patent Provisional Publication No. H5-13021 discloses an anti-reflection film in which the voids described in Publication No. 2(1990)-245702 are filled with a binder.

Japanese Patent Provisional Publication No. H7-48527 discloses an anti-reflection film comprising a binder and inorganic fine particles of porous silica.

Japanese Patent Provisional Publications No. H8-110401 and No. H8-179123 disclose an anti-reflection film which comprises a high refractive index film (having a refractive index of 1.80 or more) containing inorganic fine particles of high refractive index dispersed in a plastic material.

SUMMARY OF THE INVENTION

The present inventors made studies on incorporation of inorganic fine particles into a high refractive index layer and a low refractive index layer of anti-reflection film. For forming the layers, it is advantageous to employ a coating liquid containing inorganic fine particles, because the process has enough productivity for mass-production. However, the inventors noted the problems in forming the layers of high and low refractive indexes.

In forming a high refractive index layer, it is difficult to finely disperse the inorganic particles and further to form the layer having a well dispersed phase.

For preparing a high refractive index layer as a transparent film, the inorganic particles need to be dispersed finely and uniformly. It is generally known that surface active agents and (cationic or anionic) polymers are used for dispersing the particles. Those agents can be used only when the layer is formed. After forming the layer, they show no function, and further often impair physical strength (abrasion resistance) and chemical strength (chemical resistance) of the high refractive index layer.

It is also difficult to prepare a low refractive index layer having both a proper refractive index and enough physical strength.

The study of the inventors revealed that the refractive index can be decreased by micro voids in the layer. By piling up two or more inorganic fine particles in the layer, the micro voids can be formed between the particles. However, a low refractive index layer containing the voids generally has insufficient strength. Since the low refractive index layer is often placed on the screen of image display device or the outer surface of lens, the layer needs to have enough strength. If the voids are filled with a binder the layer has sufficient strength. However, according to the study of the inventors, such voids can not satisfyingly lower the refractive index of the layer.

An object of the invention is to provide an anti-reflection film suitable for mass-production.

Another object of the invention is to provide an anti-reflection film comprising a transparent high refractive index layer having an increased high refractive index.

Further, it is also an object of the invention to provide an anti-reflection film comprising a low refractive index layer having an decreased low refractive index.

Furthermore, it is an object of the invention to provide an anti-reflection film comprising a high or low refractive index layer having excellent strength.

In addition, an object of the invention is to provide a display device in which the reflection of light is lowered by proper means.

The objects of the invention are achieved by the following improvements (1) to (4) of high refractive index layer, the following improvements (10) to (13) of low refractive index layer, the following improvements (5) to (8) of both layers, and the following display devices (9) and (14) equipped with improved anti-reflection films.

(1) An anti-reflection film comprising a high refractive index layer having a refractive index of 1.65 to 2.40 and a low refractive index layer having a refractive index of 1.20 to 1.55, wherein the high refractive index layer contains inorganic fine particles having a mean particle size of 1 to 200 nm in an amount of 5 to 65 vol. % and a crosslinked polymer comprising phosphoric acid group or sulfonic acid group as an anionic group in an amount of 35 to 95 vol. %.

(2) The anti-reflection film of (1), wherein the polymer having the anionic group in the high refractive index layer further contains amino group or ammonium group.

(3) The anti-reflection film of (1), wherein the inorganic fine particles in the high refractive index layer have an average refractive index of 1.80 to 2.80.

(4) The anti-reflection film of (1), wherein the high refractive index layer is formed by applying a coating liquid, and the polymer having the anionic group is formed by polymerization reaction during or after the application.

(5) The anti-reflection film of (1), wherein the low refractive index layer contains inorganic fine particles having a mean particle size of 0.5 to 200 nm in an amount of 50 to 95 wt. % and a polymer in an amount of 5 to 50 wt. %, and two or more of said particles are piled up to form micro voids between the adjacent particles.

(6) The anti-reflection film of (5), wherein the low refractive index layer has a void volume in the range of 3 to 50 vol. %.

(7) The anti-reflection film of (5), wherein the inorganic fine particles in the low refractive index layer are coated with a shell of polymer.

(8) The anti-reflection film of (5), wherein the micro voids in the low refractive index layer are enclosed with the inorganic particles and the polymer.

(9) A display device having an anti-reflection film provided on the display screen, wherein
   the anti-reflection film comprises a high refractive index layer having a refractive index of 1.65 to 2.40 and a low refractive index layer having a refractive index of 1.20 to 1.55, and t
   he high refractive index layer contains inorganic fine particles having a mean particle size of 1 to 200 nm in an amount of 5 to 65 vol. % and a crosslinked polymer comprising phosphoric acid group or sulfonic acid group as an anionic group in an amount of 35 to 95 vol. %.

(10) An anti-reflection film comprising a low refractive index layer having a refractive index of 1.20 to 1.55, wherein
   the low refractive index layer contains inorganic fine particles having a mean particle size of 0.5 to 200 nm in an amount of 50 to 95 wt. % and a polymer in an amount of 5 to 50 wt. %, and two or more of said particles are piled up to form micro voids among the particles.

(11) The anti-reflection film of (10), wherein the void ratio in the low refractive index layer is in the range of 3 to 50 vol. %.

(12) The anti-reflection film of (10), wherein the inorganic fine particles in the low refractive index layer are coated with shells made of a polymer.

(13) The anti-reflection film of (10), wherein the micro voids in the low refractive index layer are enclosed with the inorganic particles and the polymer.

(14) A display device having an anti-reflection film provided on the display screen, wherein
   the anti-reflection film comprises a low refractive index layer having a refractive index of 1.20 to 1.55, and
   the low refractive index layer contains inorganic fine particles having a mean particle size of 0.5 to 200 nm in an amount of 50 to 95 wt. % and a polymer in an amount of 5 to 50 wt. %, and two or more of said particles are piled up to form micro voids among the particles.

According to the study of the inventors, the inorganic particles in the high refractive index layer can be finely dispersed and the layer can be formed with that fine dispersion maintained by incorporating the crosslinked polymer comprising phosphoric acid group or sulfonic acid group as an anionic group in an amount of 35 to 95 vol. %. Before forming the high refractive index layer, monomers having the anionic group polymerizable to form the polymer having the anionic group serve as an excellent dispersant for the inorganic particles. After forming the layer, the monomers having the anionic group are polymerized and crosslinked to form the crosslinked polymer having the anionic group. The inorganic particles are firmly bound with the crosslinked polymer having the anionic group to give excellent strength to the layer.

The inventors also succeeded in binding the inorganic particles in the low refractive index layer with a polymer without filling the micro voids with the polymer. Two or more of the particles are piled up to form the micro voids among the particles to give a very low refractive index. Further, since the particles are bound with the polymer, satisfying strength can be given. Furthermore, since the micro voids are not filled with the polymer, they can sufficiently lower the refractive index of the layer.

The thus improved high or low refractive index layer can be easily formed by applying a coating liquid, and hence is suitable for mass-production. In an anti-reflection film comprising both high and low refractive index layers, the film strength can be improved by combining those improved layers. Further, in a display device, the reflection of light on the display screen can be effectively lowered with the thus improved anti-reflection film.

EMBODIMENTS OF THE INVENTION

Layer Structure of Anti-reflection Film

By referring to FIG. 1, the layer structure of the anti-reflection film is explained below.

Figure 1:
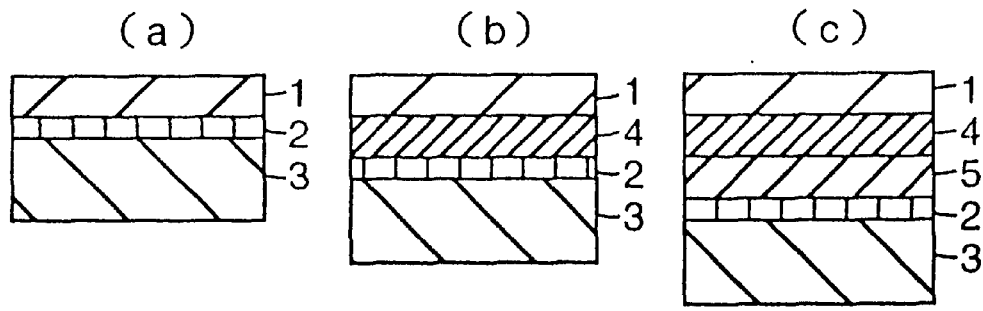
FIG. 1 shows schematic cross-sectional views of various examples of the anti-reflection film.

FIG. 1 shows cross-sectional views of various examples of the anti-reflection film.

The embodiment shown in FIG. 1(a) comprises a transparent support (3), a hard coating layer (2), and a low refractive index layer (1) superposed in order.

If the anti-reflection film is provided on a surface of hard material such as glass (e.g., on a display screen of CRT, or on a lens of glasses or camera), the hard coating layer (2) and the low refractive index layer (1) may be directly formed on the surface with using no transparent support (3).

The embodiment shown in FIG. 1(b) comprises a transparent support (3), a hard coating layer (2), a high refractive index layer (4) and a low refractive index layer (1) superposed in order.

Generally in a film comprising both high and low refractive index layers such as the film of FIG. 1(b), the high refractive index layer (4) and the low refractive index layer (1) preferably satisfy the following formulas (I) and (II), respectively, as described in Japanese Patent Provisional Publication No. 59-50401:

$$m/4\lambda \times 0.7 < n_1 d_1 < m/4\lambda \times 1.3 \qquad (I)$$

in which m represents a positive integer (generally 1, 2 or 3), $n_1$ represents a refractive index of the high refractive index layer, $d_1$ represents a thickness (nm) of the high refractive index layer; and $$n/4\lambda \times 0.7 < n_2 d_2 < n/4\lambda \times 1.3 \qquad (II)$$

in which n represents a positive odd number (generally 1), $n_2$ represents a refractive index of the low refractive index layer, and $d_2$ represents a thickness (nm) of the low refractive index layer.

The embodiment shown in FIG. 1(c) comprises a transparent support (3), a hard coating layer (2), a middle refractive index layer (5), a high refractive index layer (4) and a low refractive index layer (1) superposed in order.

In a film comprising middle, high and low refractive index layers such as the film of (c), the middle, high and low refractive index layers preferably satisfy the following formulas (III) to (V), respectively, as described in Japanese Patent Provisional Publication No. 59-50401:

$$h/4\lambda \times 0.7 < n_3 d_3 < h/4\lambda \times 1.3 \qquad (III)$$

in which h represents a positive integer (generally 1, 2 or 3), $n_3$ represents a refractive index of the middle refractive index layer, $d_3$ represents a thickness (nm) of the middle refractive index layer;

$$j/4\lambda \times 0.7 < n_4 d_4 < j/4\lambda \times 1.3 \qquad (IV)$$

in which j represents a positive integer (generally 1, 2 or 3), $n_4$ represents a refractive index of the high refractive index layer, $d_4$ represents a thickness (nm) of the high refractive index layer; and $$k/4\lambda \times 0.7 < n_5 d_5 < k/4\lambda \times 1.3 \qquad (V)$$

in which k represents a positive odd number (generally 1), ns represents a refractive index of the low refractive index layer, and $d_5$ represents a thickness (nm) of the low refractive index layer.

The high or low refractive index layer improved according to the invention can be applied for the anti-reflection films of layered structures. Even in combination with a conventional low refractive index layer, the high refractive index layer of the invention effectively improves the anti-reflection film. Also, the low refractive index layer of the invention effectively improves the film even in combination with a conventional high refractive index layer. Further, even without the high refractive index layer, the low refractive index layer of the invention can give an excellent anti-reflection film as shown in FIG. 1(a). Of course, a combination of the high and low refractive index layers of the invention gives a remarkably improved film.

The conventional high and low refractive index layers are described in publications of prior art, and hence the high refractive index layer and the low refractive index layer improved according to the invention are explained below in this order.

High Refractive Index Layer

Figure 2:
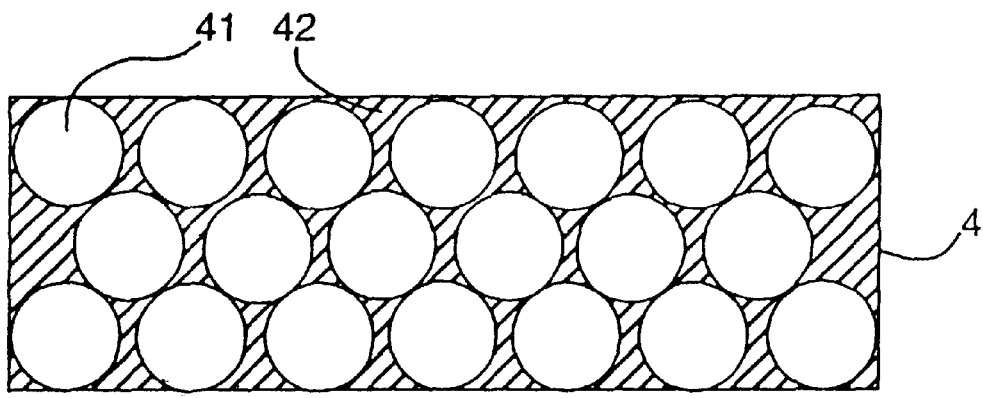
FIG. 2 is a schematic cross-sectional view of the high refractive index layer.

FIG. 2 is a schematic cross-sectional view of a high refractive index layer. Above the high refractive index layer of FIG. 2, a low refractive index layer is placed. A display device or a lens is placed below the high refractive index layer.

The high refractive index layer (4) of FIG. 2 contains no void, and a polymer (42) is charged among inorganic fine particles (41). In the high refractive index layer (4), the inorganic fine particles (41) having a mean particle size of 1 to 200 nm are piled up (in FIG. 2, three particles are piled up). Among the inorganic fine particles (41), the crosslinked polymer comprising phosphoric acid group or sulfonic acid group as an anionic group (43) is charged.

The high refractive index layer has a refractive index of 1.65 to 2.40, preferably 1.70 to 2.20. The refractive index can be measured by means of a Abbe's refractometer, or estimated according to light reflection on the surface of the layer.

The thickness of the high refractive index layer preferably is in the range of 5 nm to 100 µm, more preferably 10 nm to 10 µm, and further preferably 30 nm to 1 µm.

The haze of the high refractive index layer is preferably in the range of not more than 5%, more preferably not more than 3%, and further preferably not more than 1%.

The high refractive index layer improved according to the invention has an excellent strength. The layer preferably has a mechanical strength of not lower than H, more preferably not lower than 2H, further preferably not lower than 3H in terms of pencil grades under a load of 1 kgw.

Inorganic Fine Particles in High Refractive Index Layer

Inorganic fine particles in the high refractive index layer preferably have a refractive index of 1.80 to 2.80, more preferably 1.90 to 2.80.

The weight mean size of the inorganic fine particles in primary particles is preferably in the range of 1 to 150 nm, more preferably 1 to 100 nm, further preferably 1 to 80 nm.

In the formed high refractive index layer, the inorganic fine particles have a weight mean size of 1 to 200 nm, preferably 5 to 150 nm, more preferably 10 to 100 nm, and further preferably 10 to 80 nm.

The particle size can be determined by light-scattering or electron micrography.

The inorganic fine particles preferably have a specific surface area of 10 to 400 $m^2/g$, more preferably 20 to 200 $m^2/g$, further preferably 30 to 150 $m^2/g$.

Preferably, the inorganic fine particles are made of metal oxides or sulfides. Examples of the metal oxides or sulfides include titanium dioxide (e.g., of rutile, mixed crystal of rutile/anatase, anatase, amorphous structure), tin oxide, indium oxide, zinc oxide, zirconium oxide, and zinc sulfide. Preferred are titanium oxide, tin oxide, and indium oxide. The inorganic fine particles may contain other elements, as well as those oxides or sulfides of main component. The term of "main component" here means a component contained in the largest content (wt. %). Examples of the other elements include Ti, Zr, Sn, Sb, Cu, Fe, Mn, Pb, Cd, As, Cr, Hg, Zn, Al, Mg, Si, P, and S.

The inorganic fine particles may be subjected to surface treatment, which can be performed using inorganic compounds or organic compounds. Examples of the inorganic compounds include alumina, silica, zirconium oxide, and iron oxide. Alumina and silica are preferred. Examples of the organic compounds include polyol, alkanolamine, stearic acid, silane coupling agents, and titanate coupling agents. Silane coupling agents are particularly preferred. These may be used in combination.

The shape of the inorganic fine particles preferably is grain shape, globular shape, cubic shape, droplet shape, or irregular shape.

Two or more kinds of inorganic fine particles may be contained in the high refractive index layer.

The high refractive index layer contains the inorganic fine particles in an amount of 5 to 65 vol. %, preferably 10 to 60 vol. %, more preferably 20 to 55 vol. %.

In forming the high refractive index layer, the particles are incorporated in the form of dispersion. The medium of the dispersion is preferably a liquid having a boiling point of 60 to 170° C. Example of the medium include water, alcohols (e.g., methanol, ethanol, isopropanol, butanol, benzyl alcohol), ketones (e.g., acetone, methyl ethyl ketone, methyl isobutyl ketone, cyclohexanone), esters (e.g., methyl acetate, ethyl acetate, propyl acetate, butyl acetate, methyl formate, ethyl formate, propyl formate, butyl formate), aliphatic hydrocarbons (e.g., hexane, cyclohexane), halogenated hydrocarbons (e.g., methylene chloride, chloroform, carbon tetrachloride), aromatic hydrocarbons (e.g., benzene, toluene, xylene), amides (e.g., dimethylformamide, dimethylacetamide, n-methylpyrrolidone), ethers (e.g., diethyl ether, dioxane, tetrahydrofuran), and ether alcohol (e.g., 1-methoxy-2-propanol). Preferred ones are toluene, xylene, methyl ethyl ketone, methyl isobutyl ketone, cyclohexanone, and butanol.

The inorganic fine particles can be dispersed in the medium by means of a dispersing machine such as a sand grinder mill (e.g., a beads-mill equipped with pins), a high speed impeller mill, a pebble mill, a roller mill, an attriter, and a colloid mill. A sand grinder mill and a high speed impeller mill are particularly preferred. Prior to dispersing, pre-dispersing may be performed. Examples of the dispersing machine for pre-dispersing include a ball mill, a three-roller mill, a kneader, and an extruder.

Binder in High Refractive Index Layer

The high refractive index layer of the invention is characterized by containing a crosslinked polymer comprising phosphoric acid group or sulfonic acid group as an anionic group.

The polymer has a crosslinked main chain having anionic groups, which maintain the dispersion of the inorganic fine particles. The crosslinked structure gives film-formability so as to enhance the high refractive index layer.

Examples of the main chain include those of polyolefin (saturated hydrocarbon), polyether, polyurea, polyurethane, polyester, polyamine, polyamide, and melamine resin. The main chains of polyolefin, polyether, and polyurea are preferred. More preferred ones are those of polyolefin and polyether, and the main chain of polyolefin is further preferred.

The main chain of polyolefin consists of saturated hydrocarbons, and is, for example, prepared by addition polymerization of unsaturated polymerizable groups. The main chain of polyether consists of repeating units combined with ether bonding (—O—), and is, for example, prepared by ring-opening polymerization of epoxy groups. The main chain of polyurea consists of repeating units combined with urea bonding (—NH—CO—NH—), and is, for example, prepared by condensation polymerization between isocyanate group and amino group. The main chain of polyurethane consists of repeating units combined with urethane bonding (—NH—CO—O—), and is, for example, prepared by condensation polymerization between isocyanate group and hydroxyl group (including N-methylol group). The main chain of polyester consists of repeating units combined with ester bonding (—CO—O—), and is, for example, prepared by condensation polymerization between carboxyl group (including acid halide group) and hydroxyl group (including N-methylol group). The main chain of polyamine consists of repeating units combined with imino bonding (—NH—), and is, for example, prepared by ring-opening polymerization of ethylene imine group. The main chain of polyamide consists of repeating units combined with amido bonding (—NH—CO—), and is, for example, prepared by reaction between isocyanate group and carboxyl group (including acid halide group). Melamine resin has a crosslinked main chain, which can be prepared by condensation polymerization between triazine group (e.g., melamine) and aldehyde (e.g., formaldehyde).

The anionic group is combined with the main chain of the polymer directly or via a linking group. Preferably, the anionic group is at a side chain combined with the main chain via a linking group.

The anionic group is sulfonic acid group (sulfo group) or phosphoric acid group (phosphono group). The anionic group may be in the form of salts. In that case, cations forming the salt with the anionic group are preferably ions of alkali metals. The anionic group may be dissociated to release a proton. Examples of the linking group connecting between the anionic group and the main chain include —CO—, —O—, alkylene group, arylene group, and a divalent group derived from combination of these.

In the crosslinked structure, two or more main chains are chemically combined (preferably with covalent bonds). The crosslinked structure preferably comprises three or more main chains combined with covalent bonds. Preferably, the crosslinked structure contains —CO—, —O—, —S—, nitrogen atom, phosphorus atom, aliphatic residues, aromatic residues, and a divalent group derived from combination of these.

As the polymer, a copolymer comprising a repeating unit having an anionic group and one having a crosslinked structure is preferably used. The repeating unit having an anionic group is preferably contained in an amount of 2 to 96 wt. %, more preferably 4 to 94 wt. %, further preferably 6 to 92 wt. %. That repeating unit may have two or more kinds of anionic groups.

The repeating unit having a crosslinked structure is preferably contained in an amount of 4 to 98 wt. %, more preferably 6 to 96 wt. %, further preferably 8 to 94 wt. %.

The polymer may comprise a repeating unit having both an anionic group and a crosslinked structure.

In the polymer, other repeating units (having neither anionic group nor crosslinked structure) may be contained. Preferred other repeating units include a repeating unit having an amino group or a quaternary ammonium group, or one having a benzene ring. Similarly to anionic groups, the amino group and the quaternary ammonium group maintain the dispersion of the inorganic fine particles. The benzene ring increases the refractive index of the high refractive index layer. Those effects of amino group, quaternary ammonium group and benzene ring can be obtained even if they are incorporated in the repeating unit having an anionic group or a crosslinked structure.

In the repeating unit having an amino group or a quaternary ammonium group, the amino or quaternary ammonium group is combined with the main chain of the polymer directly or via a linking group. Preferably, the group is present as a side chain combined with the main chain via a linking group. Preferred amino or quaternary ammonium group is secondary amino group, tertiary amino group, or quaternary ammonium group. Tertiary amino group and quaternary ammonium group are more preferred. The nitrogen atom of secondary amino group, tertiary amino group, or quaternary ammonium group is preferably connected to an alkyl group, more preferably an alkyl group having 1 to 12 carbon atoms, further preferably an alkyl group having 1 to 6 carbon atoms. The counter ion of the quaternary ammonium group preferably is a halide ion. Examples of the linking groups connecting the amino or quaternary ammonium group and the main chain include —CO—, —NH—, —O—, alkylene group, arylene group, and a divalent group derived from combination of these.

If the polymer contains the repeating unit having an amino or quaternary ammonium group, the content of that unit is preferably in the range of 0.06 to 32 wt. %, more preferably 0.08 to 30 wt. %, further preferably 0.1 to 28 wt. %.

In the repeating unit having a benzene ring, the ring is combined with the main chain of the polymer directly or via a linking group. Preferably, the ring is at a side chain combined with the main chain via a linking group. The benzene ring may have a substituent (e.g., alkyl groups, hydroxyl group, halogen atoms). Examples of the linking group connecting between the benzene ring and the main chain include —CO—, —O—, alkylene group, arylene group, and a divalent group derived from combination of these.

If the polymer contains the repeating unit having a benzene ring, the content of that unit is preferably in the range of 2 to 98 wt. %, more preferably 4 to 96 wt. %, further preferably 6 to 94 wt. %.

In a polymer having a particularly preferred main chain of polyofefin, examples of a repeating unit having an anionic group (VI), a repeating unit having a crosslinked structure (VII), a repeating unit having both an anionic group and a crosslinked structure (VIII), a repeating unit having an amino or quaternary ammonium group (IX), and a repeating unit having a benzene ring (X) are shown below. The shown examples of the repeating unit (VIII) includes the unit (VIIIb) having a carboxylic group as an anionic group. If the unit (VIIIb) is employed for the invention, it is necessary to combine the unit (VIIIb) with the unit (VI) having sulfonic acid group or phosphoric acid group as an anionic group, to form a copolymer.

(VI)

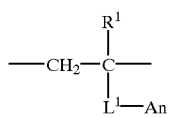

In the formula, $R^1$ is hydrogen atom or methyl group, $L^1$ is a divalent linking group, and An is sulfonic acid group or phosphoric acid group.

In the formula (VI), $L^1$ is preferably a divalent linking group selected from the group consisting of —CO—, —O—, alkylene group, arylene group, and a divalent group derived from combination of these. The alkylene group preferably has 1 to 20, more preferably 1 to 15, further preferably 1 to 10 carbon atoms, and may form a ring. The arylene group preferably has 6 to 20, more preferably 6 to 15, further preferably 6 to 10 carbon atoms. The alkylene and arylene group may have a substituent (e.g., alkyl groups, hydroxyl group, halogen atoms).

Concrete examples of $L^1$ are shown below. In each following formula, the left and right ends are connected to the main chain and An, respectively. AL and AR represent an alkylene group and an arylene group, respectively.

$L^{11}$: —CO—O—AL—(O—CO—AL)$_{m1}$— (m1 is a positive integer)
$L^{12}$: —CO—O—(AL—O)$_{m2}$—AR—AL—AR—(O—AL)$_{m3}$—
(each of m2 and m3 is a positive integer)
$L^{13}$: —CO—O—AL—
$L^{14}$: —CO—O—AL—O—CO—
$L^{15}$: —CO—O—AL—O—CO—AR—
$L^{16}$: —CO—O—AL—O—CO—AL—

The sulfonic acid group or phosphoric acid group of An in (VI) is described before.

The repeating unit of (VI) can be prepared by condensation polymerization of corresponding ethylenic unsaturated monomers. Examples of the ethylenic unsaturated monomers include: bis(polyoxyethylene polycyclic phenylether) methacrylate sulfuric ester salt, 2-sulfoethyl methacrylate, phthalic monohydroxyethylacrylate, acrylic acid dimer, 2-acrylolyoxyethylhydrogen phthalate, 2-acrylolyoxypropylhydrogen phthalate, 2-acrylolyoxypropylhexahydrohydrogen phthalate, 2-acrylolyoxypropyltetrahydrohydrogen phthalate, β-acrylolyoxyethylhydrogen succinate, β-methacrylolyoxyethylhydrogen fumarate, β-methacrylolyoxyethylhydrogen succinate, mono(2-acryloyloxyethyl)acid phosphate, and mono(2-methacryloyloxyethyl)acid phosphate. Commercially available ethylenic unsaturated monomers having these anionic groups are also employable.

(VII)

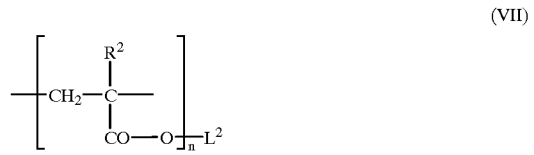

In the formula, $R^2$ is hydrogen atom or methyl group, n is an integer of not less than 2, and $L^2$ is a hydrocarbon residue of n-valent.

In the formula (VII), n is preferably an integer of 2 to 20, more preferably 2 to 10, further preferably 3 to 6. The residue of $L^2$ preferably is an aliphatic residue (more preferably a saturated aliphatic residue). The aliphatic residue may contain an ether bond (—O—), and may have a branched chain. Preferably, the residue of $L^2$ comprises 1 to 20, more preferably 2 to 15, further preferably 3 to 10 carbon atoms.

The repeating unit of (VII) can be prepared by condensation polymerization of corresponding ethylenic unsaturated monomers, which are esters between (meth)acrylic acid and polyhydric alcohols or phenols (preferably, polyhydric alcohols) corresponding to $L^2$-(—OH)$_n$. Examples of the ethylenic unsaturated monomers include: neopentyl glycol acrylate, 1,6-hexanediol acrylate, alkylene glycols such as propylene glycol diacrylate, triethylene glycol diacrylate, dipropylene glycol diacrylate, polyethylene glycol diacrylate, polypropylene glycol diacrylate, pentaerythritol diacrylate, bis{4-(acryloxy•diethoxy)phenyl}propane, bis{4-(acryloxy•polypropoxy)phenyl}propane, trimethylolpropane tri(meth)acrylate, trimethylolethane tri(meth)acrylate, 1,2,4-cyclohexane tetramethacrylate, pentaglycelol triacrylate, pentaerythritol tetra(meth)acrylate, pentaerythritol tri(meth)acrylate, (di)pentaerythritol triacrylate, (di)pentaerythritol pentaacrylate, (di)pentaerythritol tetra(meth)

acrylate, (di)pentaerythritol hexa(meth)acrylate, tripentaerythritol triacrylate, and tripentaerythritol hexatriacrylate. Commercially available esters between (meth) acrylic acid and polyhydric alcohols are also employable.

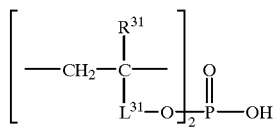

(VIII-a)

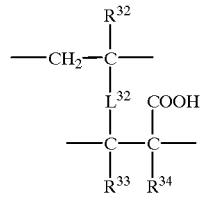

(VIII-b)

In the formulas, each of $R^{31}$, $R^{32}$, $R^{33}$ and $R^{34}$ is independently hydrogen atom or methyl group, and each of $L^{31}$ and $L^{32}$ is independently a divalent linking group.

In the formulas (VIII-a) and (VIII-b), each of $L^{31}$ and $L^{32}$ is preferably a divalent linking group selected from the group consisting of —CO—, —O—, alkylene group, arylene group, and a divalent group derived from combination of these. The alkylene group preferably has 1 to 20, more preferably 1 to 15, further preferably 1 to 10 carbon atoms, and may form a ring. The arylene group preferably has 6 to 20, more preferably 6 to 15, further preferably 6 to 10 carbon atoms. The alkylene and arylene group may have a substituent (e.g., alkyl groups, hydroxyl group, halogen atoms).

Concrete examples of $L^{31}$ and $L^{32}$ are the same as those described for $L^1$ (i.e., $L^{11}$ to $L^{16}$).

The repeating units of (VIII-a) and (VIII-b) can be prepared by condensation polymerization of corresponding ethylenic unsaturated monomers. Examples of the ethylenic unsaturated monomers for (VIII-a) include a reaction product between phosphoric acid anhydride and 6-hexanolide addition polymer of 2-hydroxyethylmethacrylate, bis(methacryloxyethyl)phosphate, 2-acryloyloxyethyl acid phosphate, and 2-methacryloyloxyethyl acid phosphate. Examples of the ethylenic unsaturated monomers for (VIII-b) include β-acrylolyoxyethylhydrogen fumarate, and β-acrylolyoxyethyl-hydrogen maleate. Commercially available ethylenic unsaturated monomers are also employable.

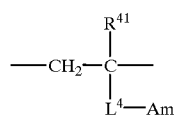

(IX-a)

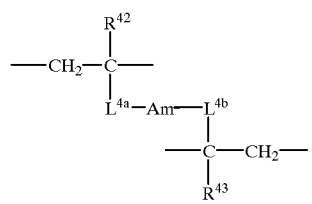

(IX-b)

In the formulas, each of $R^{41}$, $R^{42}$ and $R^{43}$ independently is hydrogen atom or methyl group, each of $L^4$, $L^{4a}$ and $L^{4b}$ independently ia a divalent linking group, and Am is an amino group or a quaternary ammonium group.

In the formulas (IX-a) and (IX-b), each of $L^4$, $L^{4a}$ and $L^{4b}$ preferably is a divalent linking group selected from the group consisting of —CO—, —NH—, —O—, alkylene group, arylene group, and a divalent group derived from combination of these. The alkylene group preferably has 1 to 20, more preferably 1 to 15, further preferably 1 to 10 carbon atoms, and may form a ring. The arylene group preferably has 6 to 20, more preferably 6 to 15, further preferably 6 to 10 carbon atoms. The alkylene and arylene group may have a substituent (e.g., alkyl group, hydroxyl group, halogen atom).

Concrete examples of $L^4$, $L^{4a}$ and $L^{4b}$ are shown below. In each following formula, the left and right ends are connected to the main chain and Am, respectively. AL represents an alkylene group.

$L^{41}$: —CO—O—AL—
$L^{42}$: —CO—O—NH—AL—
$L^{43}$: —AL—

The amino group or quaternary ammonium group of Am in (IX-a) and (IX-b) is described before.

The repeating units of (IX-a) and (IX-b) can be prepared by condensation polymerization of corresponding ethylenic unsaturated monomers. Examples of the ethylenic unsaturated monomers for (IX-a) include dimethylaminoethyl acrylate, dimethylaminopropyl acrylamide, methacrylic acid hydroxypropyltrimethylammonium chloride, dimethylaminopropyl methacrylamide, and methacrylamidepropyl trimethylammonium chloride. Examples of the ethylenic unsaturated monomers for (IX-b) include diacryldimethylammonium chloride. Commercially available ethylenic unsaturated monomers having amino group or quaternary ammonium group are also employable.

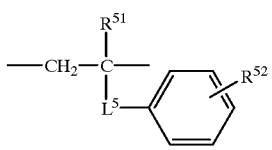

(X)

In the formula, $R^{51}$ is hydrogen atom or methyl group; $R^{52}$ is hydrogen atom, carboxyl group, an alkyl group having 1 to 6 carbon atoms, or a halogen atom; and $L^5$ is a monovalent bond or a divalent linking group.

If $R^{52}$ is carboxyl group in the formula (X), $R^{52}$ is preferably connected to the ortho position of the benzene ring.

In the formula (X), $L^5$ is preferably a divalent group derived from combination of —CO—, —O— and alkylene group. The alkylene group preferably has 1 to 20, more preferably 1 to 15, further preferably 1 to 10 carbon atoms, and may form a ring. The alkylene group may have a substituent (e.g., alkyl groups, hydroxyl group, halogen atoms).

Concrete examples of $L^5$ are shown below. In each following formula, the left and right ends are connected to the main chain and the benzene ring, respectively. AL represents an alkylene group.

$L^{50}$: monovalent bond
$L^{51}$: —CO—O—(AL—O)$_{m4}$— (m4 is a positive integer)
$L^{52}$: —CO—O—AL—

The repeating unit of (X) can be prepared by condensation polymerization of corresponding ethylenic unsaturated monomers. Examples of the ethylenic unsaturated monomers include phenoxyethyl acrylate, phenoxypolyethylene glycol acrylate, 2-hydroxy-3-phenoxypropyl acrylate, 2-acryloyloxyethyl-2-hydroxyethylphthalic acid, and 2-acryloyloxyethylphthalic acid. Commercially available ethylenic unsaturated monomers having benzene ring are also employable.

If the polymer has a main chain of polyether derived from epoxy group, repeating units in which oxygen atom (—O—) is connected to the left end of ethylene group (—CH$_2$—) of the above-described repeating units are usable.

The crosslinked polymer comprising phosphoric acid group or sulfonic acid group as an anionic group is preferably formed in the following manner. During or after applying the coating liquid (the aforementioned dispersion of inorganic fine particles) for the high refractive index layer, the monomers are added to the liquid and polymerized to form the polymer. The monomers having phosphoric acid group or sulfonic acid group as an anionic group serve as a dispersant for the inorganic particles in the coating liquid, and are preferably incorporated in an amount of 1 to 50 wt. %, more preferably 5 to 40 wt. %, further preferably 10 to 30 wt. %. On the other hand, the monomers having amino group or quaternary ammonium group serve as a dispersing aid in the coating liquid, and are preferably used in an amount of 3 to 33 wt. % based on those having an anionic group. If the polymer is formed during or after applying the coating liquid, those monomers effectively work before the application.

The reaction for forming the polymer may be photopolymerization or thermal polymerization. Photopolymerization is preferred.

For polymerization reaction, polymerization initiators are preferably used. Examples of polymerization initiators include acetophenones, benzoins, benzophenones, phosphine oxides, ketals, anthraquinones, azo compounds, peroxides, 2,3-dialkyldione compounds, disulfido compounds, fluoroamine compounds, and aromatic sulfoniums. Examples of acetophenones include 2,2-doethoxyacetophenone, p-dimethylacetophenone, 1-hydroxydimethylphenyl ketone, 1-hydroxycyclohexylphenyl ketone, 2-methyl-4-methylthio-2-morpholinopropiophenone, and 2-benzyl-2-dimethylamino-1-(4-morpholinophenyl)-butanone. Examples of benzoins include benzoin methyl ether, benzoin ethyl ether, and benzoin isopropyl ether. Examples of benzophenones include benzophenone, 2,4-dichlorobenzophenone, 4,4-dichlorobenzophenone, and p-chlorobenzophenone. Examples of phosphine oxides include 2,4,6-trimethylbenzoyldiphenylphosphine oxide. Commercially available polymerization initiators can be also used. In addition to the initiators, polymerization promoters may be used. The amount of polymerization initiators and promoters are in the range of 0.2 to 10 wt. % based on the total amount of the monomers.

If the polymer is formed by photopolymerization, light sources such as low pressure mercury lamp, high pressure mercury lamp, ultra-high pressure mercury lamp, chemical lamp and metal halide lamp are used. A high pressure mercury lamp is preferred because it gives good radiation efficiency.

For promoting the polymerization of the monomers (or oligomers), the coating liquid (i.e., dispersion of inorganic fine particles containing the monomers) may be heated. The polymer formed by photopolymerization may be further heated to promote thermosetting reaction.

Since the polymer having the anionic group is crosslinked, it is difficult to regulate its molecular weight.

The amount of the crosslinked polymer having the anionic group in the high refractive index layer is in the range of 35 to 95 vol. %, preferably 40 to 90 vol. %, more preferably 44 to 80 vol. %.

Besides the aforementioned components (inorganic fine particles, polymer, disperse medium, polymerization initiator, polymerization promoter), the high refractive index layer or the coating liquid for the layer may contain other agents such as polymerization inhibitor, leveling agent, thickening agent, anti-coloring agent, UV absorber, silane coupling agent, anti-static agent, and adhesion improver.

Examples of the leveling agents include fluorinated alkyl esters (e.g., FC-430, FC-431 [trade names], Sumitomo 3M Co., Ltd.), and polysiloxanes (e.g., SF1023, SF1054, SF1079 [trade names], General Electric; DC190, DC200, DC510, DC1248 [trade names], Dow Corning; and BYK300, BYK310, BYK320, BYK322, BYK330, BYK370 [trade names], BYK Chemie).

Low Refractive Index Layer

Figure 3:
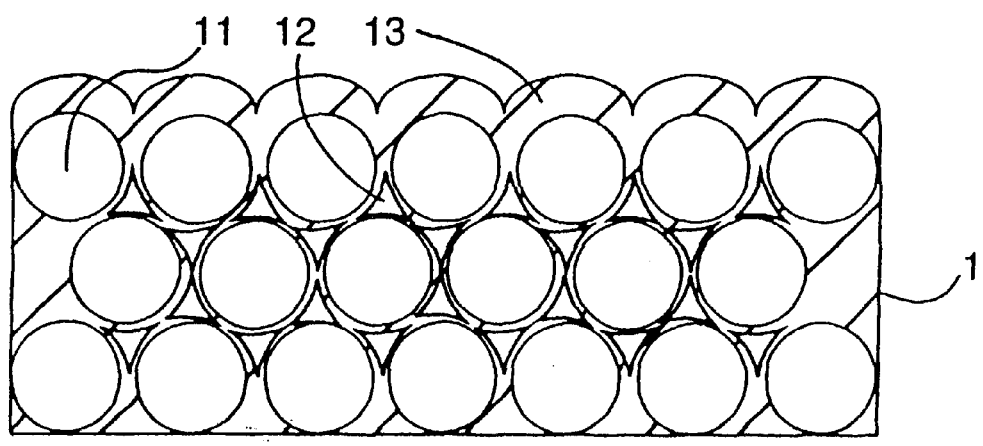
FIG. 3 is a schematic cross-sectional view of the low refractive index layer.

FIG. 3 is a schematic cross-sectional view of a low refractive index layer. The upper surface of the low refractive index layer of FIG. 3 is the surface of the anti-reflection film. A display device or a lens is placed below the layer of FIG. 3.

As shown in FIG. 3, the low refractive index layer (1) is porous. In the low refractive index layer (1), the inorganic fine particles (11) having a mean particle size of 0.5 to 200 nm are piled up (in FIG. 3, three particles are piled up). Between the inorganic fine particles (11), micro voids (12) are formed. The low refractive index layer (1) further contains polymer (13) in an amount of 5 to 50 wt. %. The polymer (13) combines the particles (11), but does not fills the micro voids (12). As shown in FIG. 1, the micro voids (12) are preferably not opened but enclosed with the polymer (13) and the inorganic fine particles (11).

The low refractive index layer has a refractive index of 1.20 to 1.55, preferably 1.30 to 1.55, more preferably 1.30 to 1.50, further preferably 1.35 to 1.45.

The thickness of the low refractive index layer is preferably in the range of 50 to 400 nm, more preferably 50 to 200 nm.

The haze of the low refractive index layer is preferably in the range of not more than 3%, more preferably not more than 2%, further preferably not more than 1%.

The low refractive index layer improved according to the invention has excellent strength. The layer preferably has a mechanical strength of not less than H, more preferably not less than 2H, further preferably not less than 3H in terms of pencil grades under a load of 1 kgw.

Inorganic Fine Particles in Low Refractive Index Layer

Inorganic fine particles in the low refractive index layer have a mean particle size of 0.5 to 200 mm. As the particle size increases, forward scattering of the layer increases. If the particles have a mean particle size of more than 200 nm, scattered light is colored. Accordingly, the mean particle size is preferably in the range of 1 to 100 nm, more preferably 3 to 70 nm, further preferably 5 to 40 nm. The inorganic fine particles preferably have uniform sizes (i.e., monodispersed).

The inorganic fine particles in the low refractive index layer are preferably made of metal oxides, nitrides, sulfides, or halides. Metal oxides and metal halides are preferred, and metal oxides and metal fluorides are particularly preferred. Examples of preferred metal elements include Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb, and Ni. Further preferred metals are Mg, Ca, B, and Si. Inorganic compounds containing two or more metals may be also used.

Particularly preferred inorganic compounds are alkali metal fluorides (e.g., NaF, KF), alkaline earth metal fluorides (e.g., $CaF_2$, $MgF_2$), and silicon dioxide ($SiO_2$).

The inorganic fine particles in the low refractive index layer preferably are amorphous.

The inorganic fine particles can be directly prepared in the form of dispersion by sol-gel method (described in Japanese Patent Provisional Publication No. 53-112732, Japanese Patent Publication No. 57-9051) or deposition method (described in Applied Optics, 27(1988), pp. 3356). Otherwise, the powder obtained by dry-precipitation method may be mechanically pulverized to prepare the dispersion. Commercially available inorganic fine particles (e.g., sol of silicon dioxide) are also usable.

For forming the low refractive index layer, the inorganic fine particles are preferably dispersed in a proper medium. Examples of the medium include water, alcohols (e.g., methanol, ethanol, isopropanol), and ketones (e.g., methyl ethyl ketone, methyl isobutyl ketone).

The low refractive index layer contains the inorganic fine particles in an amount of 50 to 95 wt. %, preferably 50 to 90 wt. %, more preferably 60 to 90 wt. %, further preferably 70 to 90 wt. %, based on the total amount of the layer.

Micro Voids in Low Refractive Index Layer

In the low refractive index layer, two or more of the inorganic particles are piled up to form micro voids between the particles. The void volume is preferably in the range of 3 to 50 vol. %, more preferably 5 to 35 vol. %.

If globular fine particles having equal sizes (completely monodispersed sizes) are charged in closest packing, the void volume is 26 vol. %. On the other hand, the particles of equal sizes charged in primitive cubic packing give the void volume of 48 vol. %. Since the sizes of practical particles are distributed in a certain extent, the low refractive index layer practically has a void ratio lower than the above values.

If the void volume (space of micro voids) increases, the refractive index of the low refractive index layer decreases. In the invention, since the inorganic fine particles are piled up to form the micro voids, the sizes of the micro voids can be easily controlled at a proper value (a value which neither scatters light nor impairs the mechanical strength of the layer) by adjusting the sizes of the particles. Further, by making the sizes of the particles uniform, those of the micro voids can be also made uniform so as to prepare the low refractive index layer having uniform optical characteristics. Thus prepared low refractive index layer is microscopically a porous film containing micro voids, but is optically or macroscopically a uniform film.

Owing to the micro voids, the low refractive index layer has a macroscopic refractive index smaller than the total of refractive indexes of the fine particles and the polymer. The refractive index of the layer is a total of the refractive index per volume of each component, and the refractive indexes of the fine particles and the polymer are above 1 while that of air is 1.00. Therefore, the micro voids can give the low refractive index layer having a very low refractive index.

The micro voids are preferably enclosed with the inorganic fine particles and the polymer in the low refractive index layer. As compared with voids having apertures on the surface of the layer, the enclosed voids scatter relatively small amount of light.

Polymer in Low Refractive Index Layer

The low refractive index layer contains a polymer in an amount of 5 to 50 wt. %. The polymer combines the inorganic fine particles, and supports the layer containing the micro voids. The amount of the polymer is adjusted so that the micro voids may not be filled with the polymer and so that the layer may have enough strength, and preferably is in the range of 10 to 30 wt. % based on the total amount of the layer.

For combining the inorganic fine particles with the polymer, the following methods are preferred.

(1) The inorganic fine particles are treated with a surface treatment agent, and then the polymer is combined with the agent on the particles.

(2) Each particle is coated as a core with a shell of the polymer, to form a core-shell structure.

(3) The polymer is used as a binder for the inorganic fine particles.

The polymer (1) combined with the surface treatment agent preferably is the same as the shell polymer (2) or the binder polymer (3). The shell polymer (2) is preferably formed around the particles by polymerization before the coating liquid for the low refractive index layer is prepared. For forming the polymer (3), the corresponding monomers are added into the coating liquid and polymerized during or after applying the liquid.

It is preferred to employ two or three of the methods (1) to (3) in combination. The combination of (1) and (3) or that of all the methods are particularly preferred.

The methods of surface treatment (1), shell polymer (2) and binder polymer (3) are explained below in this order.
(1) Surface Treatment The inorganic fine particles are preferably subjected to surface treatment, so as to improve affinity to the polymer. The surface treatment is categorized into physical treatment (such as plasma treatment and corona discharge treatment) and chemical treatment with coupling agents. In the invention, chemical treatment is preferably performed singly or in combination with physical treatment. As the coupling agents, organoalkoxy metal compounds (e.g., titanium coupling agents and silane coupling agents) are preferably used. If the inorganic fine particles are made of silicon dioxide, the surface treatment with a silane coupling agent is particularly preferred.

The silane coupling agents having the following formula (XI-a) or (XI-b) are preferred.

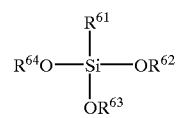

(XI-a)

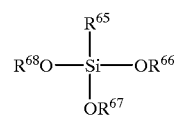

(XI-b)

In the formulas, each of $R^{61}$, $R^{65}$ and $R^{66}$ independently represents an alkyl group having 1 to 10 carbon atoms, an aryl group having 6 to 10 carbon atoms, an alkenyl group having 2 to 10 carbon atoms, an alkynyl group having 2 to 10 carbon atoms or an aralkyl group having 7 to 10 carbon atoms; and each of $R^{62}$, $R^{63}$, $R^{64}$, $R^{67}$ and $R^{68}$ independently represents an alkyl group having 1 to 6 carbon atoms or an acyl group having 2 to 6 carbon atoms.

In the formulas of (XI-a) and (XI-b), each of $R^{61}$, $R^{65}$ and $R^{66}$ is preferably an alkyl group, an aryl group, an alkenyl group or an aralkyl group. An alkyl group, an aryl group or an alkenyl group is more preferred, and an alkyl group or an alkenyl group is further preferred. The alkyl, aryl, alkenyl and aralkyl groups may have one or more substituents. Examples of the substituents include glycidyl group, glycidyloxy group, an alkoxy group, a halogen atom, an acyloxy group (e.g., acryloyloxy group, methacryloyloxy group), mercapto group, amino group, carboxyl group, cyano group, isocyanato group, and an alkenylsulfonyl group (e.g., vinylsulfonyl group).

In the formulas of (XI-a) and (XI-b), each of $R^{62}$, $R^{63}$, $R^{64}$, $R^{67}$ and $R^{68}$ preferably is an alkyl group. The alkyl group may have one or more substituents. Examples of the substituents include an alkoxy group.

The silane coupling agent preferably comprises a double bond, and the polymer is combined with the coupling agent by the reaction of the double bond. The double bond preferably is in the substituent of $R^{61}$, $R^{65}$ or $R^{66}$ in the formulas of (XI-a) and (XI-b).

The silane coupling agents having the following formula (XII-a) or (XII-b) are particularly preferred.

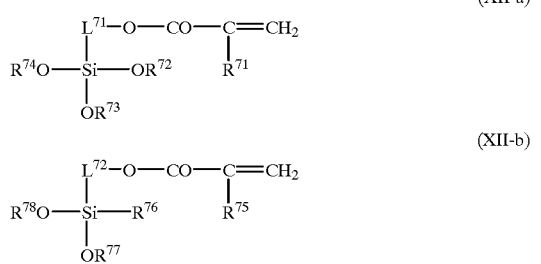

In the formulas, each of $R^{71}$ and $R^{75}$ independently represents hydrogen atom or methyl group; $R^{76}$ represents an alkyl group having 1 to 10 carbon atoms, an aryl group having 6 to 10 carbon atoms, an alkenyl group having 2 to 10 carbon atoms, an alkynyl group having 2 to 10 carbon atoms or an aralkyl group having 7 to 10 carbon atoms; each of $R^{72}$, $R^{73}$, $R^{74}$, $R^{77}$ and $R^{78}$ independently represents an alkyl group having 1 to 6 carbon atoms or an acyl group having 2 to 6 carbon atoms; and each of $L^{71}$ and $L^{72}$ independently represents a divalent linking group.

In the formula of (XII-b), $R^{76}$ is the same as $R^{61}$, $R^{65}$ and $R^{66}$ in the formulas of (XI-a) and (XI-b).

In the formulas of (XII-a) and (XII-b), $R^{72}$, $R^{73}$, $R^{74}$, $R^{77}$ and $R^{78}$ are the same as $R^{62}$, $R^{63}$, $R^{64}$, $R^{67}$ and $R^{68}$ in the formulas of (XI-a) and (XI-b), respectively.

In the formulas of (XII-a) and (XII-b), each of $L^{71}$ and $L^{72}$ is preferably an alkylene group, more preferably an alkylene group having 1 to 10 carbon atoms, further preferably an alkylene group having 1 to 6 carbon atoms.

Examples of the silane coupling agents having the formula (XI-a) include methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltriethoxysilane, γ-glycidyloxypropyltrimethoxysilane, γ-glycidyloxypropyltriethoxysilane, γ-(β-glycidyloxyethoxy)propyltrimethoxysilane, β-(3,4-epoxycyclohexyl)ethyltrimethoxysilane, β-(3,4-epoxycyclohexyl)ethyltriethoxysilane, γ-acryloyloxypropyltrimethoxysilane, γ-methacryloyloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-β-(aminoethyl)-γ-aminopropyltrimethoxysilane, and β-cyanoethyltriethoxysilane.

Preferred examples are those having a double bond such as vinyltrimethoxysilane, vinyltriethoxysilane, vinyltriacetoxysilane, vinyltrimethoxyethoxysilane, γ-acryloyloxypropyltrimethoxysilane, γ-methacryloyloxypropyltrimethoxysilane. The silane coupling agents having the formula (XII-a) such as γ-acryloyloxypropyltrimethoxysilane and γ-methacryloyloxypropyltrimethoxysilane are particularly preferred.

Examples of the silane coupling agents having the formula (XI-b) include dimethyldimethoxysilane, phenylmethyldimethoxysilane, dimethyldiethoxysilane, phenylmethyldiethoxysilane, γ-glycidyloxypropylmethyldiethoxysilane, γ-glycidyloxypropylmethyldimethoxysilane, γ-glycidyloxypropylphenyldiethoxysilane, γ-chloropropylmethyldiethoxysilane, dimethyldiacetoxysilane, γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, γ-mercaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane, and methylvinyldiethoxysilane.

Preferred examples are those having a double bond such as γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, methylvinyldimethoxysilane, and methylvinyldiethoxysilane. The silane coupling agents having the formula (XII-b) such as γ-acryloyloxypropylmethyldimethoxysilane, γ-acryloyloxypropylmethyldiethoxysilane, γ-methacryloyloxypropylmethyldimethoxysilane and γ-methacryloyloxypropylmethyldiethoxysilane are particularly preferred.

Two or more coupling agents may be used in combination. In combination with the silane coupling agents having the formula (XI-a) or (XI-b), other silane coupling agents may be used. Examples of other silane coupling agents include orthosilicic alkyl esters (e.g., methyl orthosilicate, ethyl orthosilicate, n-propyl orthosilicate, i-propyl orthosilicate, n-butyl orthosilicate, sec-butyl orthosilicate, t-butyl orthosilicate), and their hydrolyzed products.

The surface treatment with a silane coupling agent comprises the steps of adding the coupling agent to the dispersion of the inorganic particles, and storing the dispersion at a temperature of room temperature to 60° C. for a period of several hours to 10 days. For accelerating the treatment, inorganic acids (e.g., sulfuric acid, hydrochloric acid, nitric acid, chromic acid, hypochlorous acid, boric acid, orthosilicic acid, phosphoric acid, carbonic acid), organic acids (e.g., acetic acid, polyacrylic acid, benzenesulfonic acid, phenol, polyglutamic acid) or their salts (e.g., metallic salts, ammonium salts) may be added to the dispersion.

(2) Shell Polymer

The polymer for shell preferably has a main chain of saturated hydrocarbon. Further, the polymer preferably has fluorine atoms in the main chain or side chain, more preferably in the side chain. Preferred examples of the polymer include polyacrylic esters and polymethacrylic esters. Esters between fluorinated alcohols and poly(meth)acrylic acid are particularly preferred.

The refractive index of shell polymer decreases as the fluorine content in the polymer increases. For depressing the refractive index of the low refractive index layer, the shell polymer preferably contains fluorine in an amount of 35 to 80 wt. %, more preferably 45 to 75 wt. %.

The polymer containing fluorine atoms is preferably prepared by polymerization of an ethylenic unsaturated monomer having a fluorine atom. Examples of the ethylenic unsaturated monomers having fluorine atom include fluoroolefins (e.g., fluoroethylene, vinylidene fluoride, tetrafluoroethylene, hexafluoropropylene, and perfluoro-2, 2-dimethyl-1,3-dioxol), fluorinated vinylether, and esters between fluorinated alcohols and (meth)acrylic acid.

The polymer containing fluorine atoms particularly preferably comprises the following repeating unit (XIII) containing fluorine atoms.

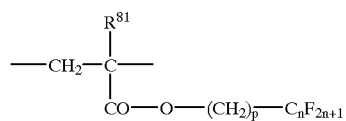

(XIII)

In the formula, $R^{81}$ represents hydrogen atom or fluorine atom; p is 0 or a positive integer; and n is a positive integer.

The shell polymer may be a copolymer comprising repeating units having fluorine atoms and ones having no fluorine atom. The repeating units having no fluorine atom are preferably prepared by polymerization of an ethylenic unsaturated monomer having no fluorine atom. Examples of the ethylenic unsaturated monomers having no fluorine atom include olefins (e.g., ethylene, propylene, isoprene, vinyl chloride, and vinylidene chloride), acrylic esters (e.g., methyl acrylate, ethyl acrylate, an 2-ethylhexyl acrylate), methacrylic esters (e.g., methyl methacrylate, ethyl methacrylate, butyl methacrylate, and ethylene glycol dimethacrylate), styrene and its derivatives (e.g., styrene, divinylbenzene, vinyltoluene, and α-methylstyrene), vinyl ethers (e.g., methylvinyl ether), vinyl esters (e.g., vinyl acetate, vinyl propionate, and vinyl cinnamate), acrylamides (e.g., N-tert-butylacrylamide and N-cyclohexylacrylamide), methacrylamide, and acrylonitrile.

If the binder polymer (3) described below is used in combination, the shell polymer and the binder polymer may be chemically combined with crosslinking. The crosslinking can be formed by introducing crosslinkable functional groups into the shell polymer.

The shell polymer may be crystalline. If the shell polymer has a glass transition temperature (Tg) higher than the temperature at which the low refractive index layer is formed, the micro voids in the layer are easily maintained. However, in that case, the inorganic fine particles are often insufficiently combined, and consequently the low refractive index layer can not be formed as a continuous layer (consequently, the resultant layer has insufficient mechanical strength). Accordingly, the binder polymer (3) described below is preferably used in combination, so as to form a continuous low refractive index layer.

Core-shell fine particles are prepared by forming polymer shells around the inorganic fine particles. The core-shell fine particles preferably contain cores of the inorganic fine particles in an amount of 5 to 90 vol. %, more preferably 15 to 80 vol. %.

The polymer shell is preferably formed by radical polymerization. The radical polymerization is described in "Experimental method of polymer synthesis" written by T.Ohtsu and M.Kinoshita, published by Kagakudojin (1972); and "Lectures, Polymerization Reaction, Radical Polymerization (I)" written by T.Ohtsu, published by Kagakudojin (1971). The radical polymerization is preferably performed in accordance with emulsion polymerization method or dispersion polymerization method, which are described in "Chemistry of Polymer Latex" written by S.Muroi, published by Kobunshi-kankokai (1970) and "Dispersion Polymerization in Organic Media" written by Barrett and Keih E. J., published by John Willey & Sons (1975).

Examples of initiators for the emulsion polymerization include inorganic peroxides (e.g., potassium persulfate, ammonium persulfate), azonitriles (e.g., sodium azobiscyanovalerate), azoamidine compounds (e.g., 2,2'-azobis(2-methylpropionamide) hydrochloride), cyclic azoamidine compounds (e.g., 2,2'-azobis(2-(5-methyl-2-imidazolin-2-yl)propane hydrochloride), azoamide compounds (e.g., 2,2'-azobis{2-methyl-N-[1,1'-bis(hydroxymethyl)-2-hydroxyethyl]propione amide). Inorganic peroxides are preferred, and potassium persulfate and ammonium persulfate are particularly preferred.

Examples of initiators for the dispersion polymerization include azo compounds (e.g., 2,2'-azobisisobutylonitrile, 2,2'-azobis(2,4-dimethylvaleronitrile), dimethyl-2,2'-azobis (2-methylpropionate), dimethyl-2,2'-azobisisobutylate), and organic peroxides (e.g., lauryl peroxide, benzoyl peroxide, and tert-butylperoctoate).

The dispersion polymerization method preferably comprises the steps of mixing a dispersing agent of polymer and the surface-treated inorganic fine particles, adding the monomers and the initiator to the mixture, and polymerizing the monomers in a medium which does not dissolve the formed polymer.

Examples of the medium include water, alcohols (e.g., methanol, ethanol, propanol, isopropanol, 2-methoxy-1-propanol, butanol, t-butanol, pentanol, neopentanol, cyclohexanol, 1-methoxy-2-propanol), methyl ethyl ketone, acetonitrile, tetrahydrofuran, and ethyl acetate. Preferred are water, methanol, ethanol and isopropanol. Two or more media may be used in combination.

In the emulsion or dispersion polymerization method, chain transfer agents may be used. Examples of the chain transfer agents include halogenated hydrocarbons (e.g., carbon tetrachloride, carbon tetrabromide, ethyl acetate dibromide, ethyl acetate tribromide, ethylbenzene dibromide, ethane dibromide, and ethane dichloride), hydrocarbons (e.g., benzene, ethylbenzene, and isopropylbenzene), thioethers (e.g., diazothioether), mercaptans (e.g., t-dodecyl mercaptan, n-dodecyl mercaptan, hexadecyl mercaptan, n-octadecyl mercaptan, and thioglycerol), disulfides (e.g., diisopropylxanthogendisulfide), thioglycollic acid and its derivatives (e.g., thioglycolic acid, 2-ethylhexyl thioglycolate, butyl thioglycolate, methoxybutyl thioglycolate, and trimethylolpropane tris(thioglycolate)).

Two or more kinds of core-shell fine particles may be used in combination. Further, the core-shell fine particles may be used in combination with inorganic fine particles having no shells.

(3) Binder Polymer

The binder polymer preferably has a main chain of saturated hydrocarbon or polyether, more preferably a main chain of saturated hydrocarbon. Preferably, the binder polymer is crosslinked.

The polymer having a main chain of saturated hydrocarbon is preferably prepared by polymerization of ethylenic unsaturated monomers. For preparing a crosslinked binder polymer, monomers having two or more ethylenic unsaturated groups are preferably used.

Examples of the monomer having two or more ethylenic unsaturated groups include esters of polyhydric alcohols and (meth)acrylic acid (e.g., ethyleneglycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth)acrylate, 1,2,3-cyclohexanetetramethacrylate, polyurethane polyacrylate, and polyester polyacrylate), and vinylbenzene and its derivatives (e.g., 1,4-divinylbenzene, 4-vinylbenzoic acid-2-acryloylethyl ester and 1,4-divinylcyclohexanone), vinylsulfones (e.g., divinylsulfone), acrylamides (e.g., methylene bisacrylamide), and methacrylamide.

The polymer having a main chain of polyether is preferably prepared by ring-opening polymerization of multifunctional epoxy compounds.

In place of or in addition to the monomer having two or more ethylenic unsaturated groups, crosslinking groups may be incorporated into the binder polymer to form a crosslinked structure. Examples of the crosslinking functional groups include isocyanato group, epoxy group, aziridine group, oxazoline group, aldehyde group, carbonyl group, hydrazine group, carboxyl group, methylol group, and active methylene group. Further, vinylsulfonic acid, acid anhydrides, cyanoacrylate derivatives, melamine, etherized methylol, esters, and urethane are also employable as monomers for forming the crosslinked structure. The functional groups, such as block isocyanate group, decomposed to form the crosslinked structure are also employable.

The term of "crosslinking groups" in the invention is not used to restrict by the aforementioned compounds, and include the groups decomposable to give an active compound.

If the binder polymer is used in combination with the shell polymer (2), the glass transition temperature (Tg) of the binder polymer preferably is lower than that of the shell polymer. The difference between those glass transition temperatures preferably is not less than 5° C., more preferably not less than 20° C.

The binder polymer is preferably prepared by the steps of adding the monomers to the coating liquid for the low refractive index layer, and polymerizing (and if needed crosslonking) the monomers during or after applying the liquid. Examples of the polymerization initiator for the binder polymer are the same as those descried for the shell polymer. In the coating liquid for low refractive index layer, a small amount of polymer (such as polyvinyl alcohol, polyoxyethylene, polymethylmethacrylate, polymethylacrylate, diacetylcellulose, triacetylcellulose, nitrocellulose, polyester, or alkyd resin) may be added.

Transparent Support

Except the case that the anti-reflection film is directly provided on a lens or a display screen of CRT, the film is preferably provided on a transparent support. As the support, a plastic film is more preferable than a glass plate.

Examples of the plastic materials for the support include cellulose derivatives (e.g., diacetyl cellulose, triacetyl cellulose, propionyl cellulose, butyryl cellulose, acetyl propionyl cellulose, and nitrocellulose), polyamides, polycarbonates, polyesters (e.g., polyethylene terephthalate, polyethylene naphthalate, polybutylene terephthalate, poly-1,4-cyclohexanedimethylene terephthalate, and polyethylene-1,2-diphenoxyethane-4,4'-dicarboxylate), polystyrene (e.g., syndiotactic polystyrene), polyolefins (e.g., polypropylene, polyethylene and polymethylpentene), polymethyl methacrylate, polysulfone, polyethersulfone, polyarylate, polyether ketone, and polyether imide. Triacetyl cellulose, polycarbonates, and polyethylene terephthalate are preferred.

The transparent support preferably has a percent transmission of not less than 80%, more preferably not less than 86%. The haze of the support is preferably in the range of not more than 2.0%, more preferably not more than 1.0%. The support preferably has a refractive index of 1.4 to 1.7.

IR absorbers or UV absorbers may be incorporated into the transparent support. The amount of the IR absorber is preferably in the range of 0.01 to 20 wt. %, more preferably 0.05 to 10 wt. %. As a slipping agent, particles of inactive inorganic compound may be contained in the transparent support. Examples of the inorganic compound include $SiO_2$, $TiO_2$, $BaSO_4$, $CaCO_3$, talc, and kaolin.

The transparent support may be subjected to surface treatment. Examples of the surface treatments include chemical treatment, mechanical treatment, corona discharge treatment, flame treatment, UV treatment, high frequency treatment, glow discharge treatment, active plasma treatment, laser treatment, mix acid treatment, and ozone-oxidation treatment. Preferred treatments are glow discharge treatment, UV treatment, corona discharge treatment, and flame treatment. Glow discharge treatment and UV treatment are particularly preferred.

Middle Refractive Index Layer

As shown in FIG. 1(c), a middle refractive index layer may be provided between the high refractive index layer and the transparent support. The refractive index of the middle refractive index layer is adjusted to a value between those of the high and low refractive index layers, and preferably is in the range of 1.55 to 1.70.

The middle refractive index layer is preferably formed with a polymer having a relatively high refractive index. Examples of the polymer having a high refractive index include polystyrene, styrene copolymer, polycarbonate, melamine resin, phenol resin, epoxy resin, and polyurethane derived from the reaction between cyclic (alicyclic or aromatic) isocyanate and polyol. Further, other polymers having cyclic (aromatic, heterocyclic, or alicyclic) groups and polymers substituted with a halogen atom other than fluorine also have a high refractive index. The polymer may be prepared by polymerization of a monomer having double bond for radical hardening.

In the polymer, inorganic fine particles having a high refractive index may be dispersed. If those particles are used, even polymers having a relatively low refractive index can be used for dispersing the particles stably. Examples of those polymers include vinyl polymers (including acrylic polymers), polyester polymers (including alkyd polymer), cellulose polymers, and urethane polymers.

The middle refractive index layer may contain silicon compounds substituted with organic groups. As the silicon compounds, the aforementioned silane coupling agents and its derivatives for surface treatment of the inorganic fine particles in the low refractive index layer are preferably employed.

As the material of the inorganic fine particles in the middle refractive index layer, oxides of metals (e.g., aluminum, titanium, zirconium, antimony) are preferred. Powder or colloidal dispersion of the particles is mixed with the polymer or the organic silicon compounds.

The inorganic fine particles preferably has a mean particle size of 10 to 100 nm.

The middle refractive index layer may be formed of film-formable organometallic compounds. Preferably, the organometallic compounds are liquids or can be dispersed in a proper medium.

Examples of the organometallic compounds include metal alcoholates (e.g., titanium tetraethoxide, titanium tetra-i-propoxide, titanium tetra-n-propoxide, titanium tetra-n-butoxide, titanium tetra-sec-butoxide, titanium tetra-tert-butoxide, aluminum triethoxide, aluminum tri-i-propoxide, aluminum tributoxide, antimony triethoxide, antimony tri-butoxide, zirconium tetraethoxide, zirconium tetra-i-propoxide, zirconium tetra-n-propoxide, zirconium tetra-n-butoxide, zirconium tetra-sec-butoxide, zirconium tetra-tert-butoxide), chelate compounds (e.g., di-isopropoxy titanium bisacetylacetonate, di-butoxy titanium bisacetylacetonate, di-ethoxy titanium bisacetylacetonate, bis-acetylacetone zirconium, aluminum acetylacetonate, aluminum di-n-butoxidemonoethylacetonate, aluminum di-i-propoxide-monomethylacetoacetate, tri-n-butoxidezirconium monoethylacetate), organic acid salts (e.g., zirconium ammonium carbonate), and active inorganic polymers mainly comprising zirconium.

The middle refractive index layer may contain alkyl silicates, their hydrolyzed products, and fine particles of silica, particularly colloidal dispersion of silica-gel.

The haze of the middle refractive index layer preferably is not more than 3%.

Other Layers

Besides the aforementioned layers, the anti-reflection film may have other layers such as a hard coating layer, a moisture proof layer, an antistatic layer, an undercoating layer, and a protective layer.

The hard coating layer gives scratch resistance, and further enhances adhesion between the transparent support and the layer provided thereon. The hard coating layer can be formed of acrylic polymers, urethane polymers, epoxy polymers, silicon polymers, or silica compounds. Pigments may be added to the hard coating layer.

The acrylic polymers are preferably prepared by polymerization of multi-functional monomers (e.g., polyol acrylate, polyester acrylate, urethane acrylate, and epoxy acrylate). Examples of the urethane polymers include melamine polyurethane. Preferred examples of the silicon polymers include products derived from co-hydrolysis between silane compounds (e.g., tetraalkoxysilane and alkyltrialkoxysilane), and silane coupling agents having active groups (e.g., epoxy, methacryl). Two or more polymers may be used in combination. As the silica compound, colloidal silica is preferably used. The hard coating layer preferably has a mechanical strength of not less than H, more preferably not less than 2H, further preferably not less than 3H in terms of pencil grades under a load of 1 kgw.

In addition to the hard coating layer, other layers such as an adhesive layer, a shielding layer, a slippery layer and an antistatic layer may be also provided on the transparent support. The shielding layer protects the film from electromagnetic waves such as infrared rays.

A protective layer may be provided on the low refractive index layer. The protective layer also serves as a slippery layer or a anti-stain layer.

Examples of slipping agents for the slippery layer include polyorganosiloxanes (e.g., polydimethylsiloxane, polydiethylsiloxane, polydiphenylsiloxane, polymethylphenylsiloxane, and alkyl-modified polydimethylsiloxane), natural waxes (e.g., carnauba wax, candelilla wax, jojoba oil, rice wax, Japan wax, bees wax, hydrous lanolin, spermaceti, and montan wax), petroleum waxes (e.g., paraffin wax and microcrystalline wax), synthetic waxes (e.g., polyethylene wax and Fischer-Tropsch wax), higher fatty acid amides (e.g., stearamide, oleic amide, and N,N'-methylenebisstearamide), higher fatty acid esters (e.g., methyl stearate, butyl stearate, glycerol monostearate, and sorbitan monooleate), higher fatty acid metal salts (e.g., zinc stearate), and polymers containing fluorine (e.g., per-fluoropolyether having a perfluoro main chain, perfluoropolyether having a perfluoro side chain, perfluoropolyether modified with alcohol, and perfluoropolyether modified with isocyanate).

The anti-stain layer contains hydrophobic compounds containing fluorine (e.g., polymer containing fluorine, surface active agent containing fluorine, oil containing fluorine).

The protective layer has a thickness of not more than 20 nm, preferably 2 to 20 nm, more preferably 3 to 20 nm, further preferably 5 to 10 nm, so as not to affect the performance of anti-reflection.

Anti-reflection Film

Each layer of the anti-reflection film can be formed by dip coating, air knife coating, curtain coating, roller coating, wire bar coating, gravure coating, and extrusion coating (described in U.S. Pat. No. 2,681,294). Two or more layers may be simultaneously formed by coating. The method for simultaneous coating is described in U.S. Pat. Nos. 2,761,791, 2,941,898, 3,508,947, and 3,526,528; and "Coating Engineering" pp.253, written by Y. Harazaki, published by Asakura Shoten (1973).

The anti-reflection film may have anti-glare function, which means that the film may be made to scatter external light. For the anti-glare function, small convexes are formed on the surface of the film. As shown in FIG. 3, a low refractive index layer containing fine particles has a surface having convexes formed with the particles. If those convexes give insufficient anti-glare function, relatively large particles (having a mean particle size of 50 nm to 2 um) may be incorporated in a small amount (0.1 to 50 wt. %).

The haze of the anti-reflection film is preferably in the range of 3 to 30%, more preferably 5 to 20%, further preferably 7 to 20%.

The anti-reflection film of the invention can be applied on a display device such as a liquid crystal display (LCD), a plasma display (PDP), an electroluminescence display (ELD) or a cathode ray tube display (CRT). If the film has a transparent support, the support is attached to the display surface. The film can be also placed on a case cover, an optical lens, a lens for glasses, a windshield, a light cover, and a cover of helmet.

EXAMPLE 1

Preparation of Titanium Dioxide Dispersion

Thirty weight parts of titanium dioxide [weight mean particle size of primary particles: 50 nm, refractive index: 2.70], 3 weight parts of the following anionic monomer (1), 3 weight parts of the following anionic monomer (2), and 64 weight parts of methyl ethyl ketone were mixed by means of a sand grinder to prepare a dispersion of titanium dioxide.

anionic monomer (1)

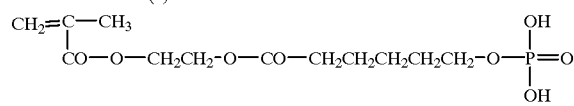

anionic monomer (2)

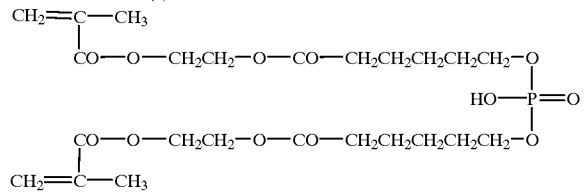

The weight mean particle size of titanium dioxide in the prepared dispersion was determined by means of a coaltar counter. The results are shown in Table 1.

Preparation of Coating Liquid for High Refractive Index Layer

A mixture of dipentaerythritol pentaacrylate and dipentaerythritol hexaacrylate [DPHA, Nippon Kayaku Co., Ltd.], a photopolymerization initiator [Irgacure 907, Ciba-Geigy], a photosensitizer [Kayacure DETX, Nippon Kayaku Co., Ltd.], and methyl ethyl ketone were mixed. The weight ratio of the photopolymerization initiator to the photosensitizer was set at 3/1, and the volume ratio of the titanium dioxide to the monomers (i.e., the total amount of dipentaerythritol pentaacrylate, dipentaerythritol hexaacrylate, and the anionic monomers (1) and (2)) was set at 40/60. The total amount of the photopolymerization initiator and the photosensitizer was adjusted to 3 wt. % based on the total amount of the monomers.

The dispersion stability of titanium dioxide in the prepared coating liquid was evaluated by the following precipitation test. After storing for 100 hours, the nature of the liquid was determined according to whether the clear top part was observed or not. The marke "A" means that the clear top part was not observed, and the mark of "B" means that it was observed. The results are shown in Table 1.

Formation of High Refractive Index Layer

On a polyethylene terephthalate film having 90 μm thickness, a hard coating layer was provided. The coating liquid for high refractive index layer was applied on the hard coating layer with a bar coater, and irradiated with UV light to harden. Thus, a high refractive index layer having 200 nm thickness (aftre dryness) was formed.

The haze of the formed layer was measured by means of a haze meter (NDH-1001DP, Nippon Denshoku Kogyo Co., Ltd.), and the refractive index was calculated from the reflectance measured with a reflectance meter (V-550 and ARV-474, Nippon Bunko Co., Ltd.). Further, the mechanical strength was evaluated in terms of pencil hardness (under a load of 1 kgw). The results are set forth in Table 1.

Formation of Low Refractive Index Layer

Six g of dipentaerythritol hexaacrylate, 0.5 g of a photopolymerization initiator [Irgacure 907, Ciba-Geigy], 0.2 g of a photosensitizer [Kayacure DETX, Nippon Kayaku Co., Ltd.], and 20 g of ethyl acetate were dispersed and emulsified in 100 g of water with 1 g of sodium dodecybenzene sulfonate. The emulsified liquid and 100 g of fine particles (mean particle size: 52 nm) of copolymer of methyl methacrylate (80 weight parts)-divinylbenzene (25 weight parts) were mixed and stirred to form a coating liquid for low refractive index layer.

The coating liquid was applied on the high refractive index layer with a bar coater to form a layer having the thickness of 100 nm. After drying, the layer was heated to 100° C., and irradiated with UV light of a 12 W/cm high pressure mercury lamp for 1 minute to crosslink the polymer. The layer was cooled to room temperature, so as to form a low refractive index layer (refractive index: 1.55).

Thus, an anti-reflection film was produced.

COMPARISON EXAMPLE 1

30 weight parts of titanium dioxide [weight mean particle size of primary particles: 50 nm, refractive index: 2.70] and 64 weight parts of methyl ethyl ketone were mixed by means of a sand grinder to prepare a dispersion of titanium dioxide.

Except for using thus prepared dispersion, the procedure of Example 1 was repeated to produce an anti-reflection film and to evaluate the film. The results are set forth in Table 1.

COMPARISON EXAMPLE 2

30 weight parts of titanium dioxide [weight mean particle size of primary particles: 50 nm, refractive index: 2.70], 6 weight parts of a phosphoric surface active agent [Phosphanol RD-720, Toho Kagaku Kogyo Co., Ltd.], and 64 weight parts of methyl ethyl ketone were mixed by means of a sand grinder to prepare a dispersion of titanium dioxide.

Except for using thus prepared dispersion, the procedure of Example 1 was repeated to produce an anti-reflection film and to evaluate the film. The results are set forth in Table 1.

COMPARISON EXAMPLE 3

30 weight parts of titanium dioxide [weight mean particle size of primary particles: 50 nm, refractive index: 2.70], 1.5 weight parts of a phosphoric surface active agent [Phosphanol RD-720, Toho Kagaku Kogyo Co., Ltd.], and 68.5 weight parts of methyl ethyl ketone were mixed by means of a sand grinder to prepare a dispersion of titanium dioxide.

Except for using thus prepared dispersion, the procedure of Example 1 was repeated to produce an anti-reflection film and to evaluate the film. The results are set forth in Table 1.

EXAMPLE 2

30 weight parts of titanium dioxide [weight mean particle size of primary particles: 50 nm, refractive index: 2.70], 6 weight parts of the following anionic monomer (3), and 64 weight parts of methyl ethyl ketone were mixed by means of a sand grinder to prepare a dispersion of titanium dioxide.

anionic monomer (3)

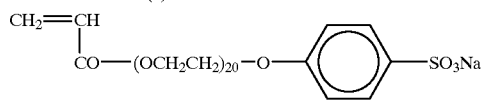

Except for using thus prepared dispersion, the procedure of Example 1 was repeated to produce an anti-reflection film and to evaluate the film. The results are set forth in Table 1.

EXAMPLE 3

30 weight parts of tin oxide [weight mean particle size of primary particles: 10 nm, refractive index: 2.00], 3 weight parts of the anionic monomer (1) in Example 1, 3 weight parts of the anionic monomer (2) in Example 1, and 64 weight parts of methyl ethyl ketone were mixed by means of a sand grinder to prepare a dispersion of tin oxide.

Except for using thus prepared tin oxide dispersion in place of titanium dioxide dispersion, the procedure of Example 1 was repeated to produce an anti-reflection film and to evaluate the film. The results are set forth in Table 1.

EXAMPLE 4

30 weight parts of titanium dioxide [weight mean particle size of primary particles: 110 nm, refractive index: 2.70], 6 weight parts of the following anionic monomer (4), and 64 weight parts of methyl ethyl ketone were mixed by means of a sand grinder to prepare a dispersion of titanium dioxide.

anionic monomer (4)

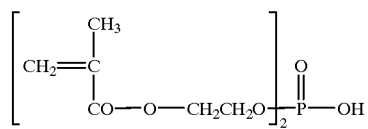

Except for using thus prepared dispersion, the procedure of Example 1 was repeated to produce an anti-reflection film and to evaluate the film. The results are set forth in Table 1.

COMPARISON EXAMPLE 4

30 weight parts of titanium dioxide [weight mean particle size of primary particles: 200 nm, refractive index: 2.70], 3 weight parts of the anionic monomer (1) in Example 1, 3 weight parts of the anionic monomer (2) in Example 1, and 64 weight parts of methyl ethyl ketone were mixed by means of a sand grinder to prepare a dispersion of titanium dioxide.

Except for using thus prepared dispersion, the procedure of Example 1 was repeated to produce an anti-reflection film and to evaluate the film. The results are set forth in Table 1.

EXAMPLE 5

30 weight parts of tin oxide [weight mean particle size of primary particles: 10 nm, refractive index: 2.00], 6 weight parts of the following anionic monomer (5), and 64 weight parts of methyl ethyl ketone were mixed by means of a sand grinder to prepare a dispersion of tin oxide.

anionic monomer (5)

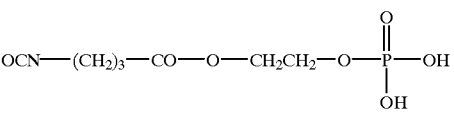

To thus prepared dispersion, glycerol dimethacrylate (Blemmer GMR, Nippon Yushi Co., Ltd.), a photopolymerization initiator [Irgacure 907, Ciba-Geigy], a photosensitizer [Kayacure DETX, Nippon Kayaku Co., Ltd.], and methyl ethyl ketone were added. The weight ratio of the photopolymerization initiator to the photosensitizer was set at 3/1, and the volume ratio of the tin oxide to the monomers (i.e., the total amount of glycerol dimethacrylate and the anionic monomer (5)) was set at 40/60. The total amount of the photopolymerization initiator and the photosensitizer was adjusted to 3 wt. % based on the total amount of the monomers.

Except for using thus prepared coating liquid for high refractive index layer, the procedure of Example 1 was repeated to produce an anti-reflection film and to evaluate the film. The results are set forth in Table 1

EXAMPLE 6

30 weight parts of tin oxide [weight mean particle size of primary particles: 10 nm, refractive index: 2.00], 6 weight parts of the following anionic monomer (6), and 64 weight parts of methyl ethyl ketone were mixed by means of a sand grinder to prepare a dispersion of tin oxide.

anionic monomer (6)

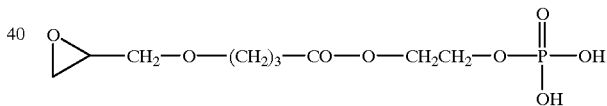

To the tin oxide dispersion, the following epoxy cyclohexane monomer [Eripord GT300, Daicel Chemical Industries Ltd.], the following aromatic sulfonium salt (photopolymerization initiator), and methyl ethyl ketone were added. The volume ratio of the tin oxide to the monomers (i.e., the total amount of the epoxy cyclohexanic monomer and the anionic monomer (6)) was set at 40/60. The amount of the aromatic sulfonium salt was adjusted to 3 wt. % based on the total amount of the monomers.

epoxy cyclohexanic monomer

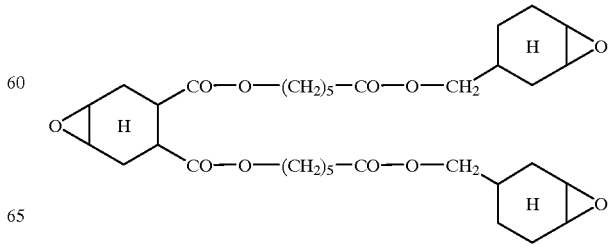

aromatic sulfonium salt

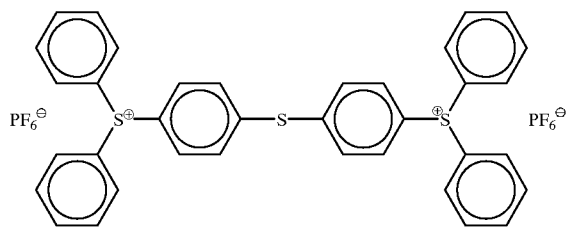

On a polyethylene terephthalate film having 90 μm thickness, a hard coating layer was provided. The prepared coating liquid for high refractive index layer was applied on the hard coating layer with a bar coater, irradiated with UV light and heated to harden. Thus, a high refractive index layer having 200 nm thickness (after dryness) was formed.

On thus formed high refractive index layer, a low refractive index layer is provided in the manner of Example 1 to produce an anti-reflection film. The film was then evaluated, and the results are set forth in Table 1.

EXAMPLE 7

30 weight parts of titanium dioxide [weight mean particle size of primary particles: 30 nm, refractive index: 2.70], 6 weight parts of the following anionic monomer (7), 1 weight part of n-octylamine, and 63 weight parts of methyl ethyl ketone were mixed by means of a sand grinder to prepare a dispersion of titanium dioxide.

anionic monomer (7)

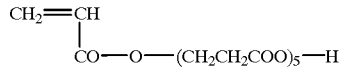

To the dispersion of titanium dioxide, a mixture of dipentaerythritol pentaacrylate and dipentaerythritol hexaacrylate [DPHA, Nippon Kayaku Co., Ltd.], a photopolymerization initiator [Irgacure 907, Ciba-Geigy], a photosensitizer [Kayacure DETX, Nippon Kayaku Co., Ltd.], and methyl ethyl ketone were added. The weight ratio of the photopolymerization initiator to the photosensitizer was set at 3/1, and the volume ratio of the titanium dioxide to the monomers (i.e., the total amount of dipentaerythritol pentaacrylate, dipentaerythritol hexaacrylate, and the anionic monomer (7)) was set at 48/52. The total amount of the photopolymerization initiator and the photosensitizer was adjusted to 3 wt. % based on the total amount of the monomers.

Except for using thus prepared coating liquid for high refractive index layer, the procedure of Example 1 was repeated to produce an anti-reflection film and to evaluate the film. The results are set forth in Table 1.

EXAMPLE 8

30 weight parts of titanium dioxide [weight mean particle size of primary particles: 50 nm, refractive index: 2.70], 3 weight parts of anionic monomer (1) in Example 1, 3 weight parts of anionic monomer (2) in Example 1, 1 weight part of the following cationic monomer, and 63 weight parts of methyl ethyl ketone were mixed by means of a sand grinder to prepare a dispersion of titanium dioxide.

cationic monomer

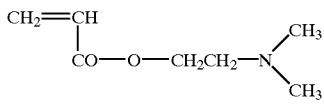

To the dispersion of titanium dioxide, a mixture of dipentaerythritol pentaacrylate and dipentaerythritol hexaacrylate [DPHA, Nippon Kayaku Co., Ltd.], a photopolymerization initiator [Irgacure 907, Ciba-Geigy], a photosensitizer [Kayacure DETX, Nippon Kayaku Co., Ltd.], and methyl ethyl ketone were added. The weight ratio of the photopolymerization initiator to the photosensitizer was set at 3/1, and the volume ratio of the titanium dioxide to the monomers (i.e., the total amount of dipentaerythritol pentaacrylate, dipentaerythritol hexaacrylate, the anionic monomers (1) and (2), and the cationic monomer) was set at 51/49. The total amount of the photopolymerization initiator and the photosensitizer was adjusted to 3 wt. % based on the total amount of the monomers.

Except for using thus prepared coating liquid for high refractive index layer, the procedure of Example 1 was repeated to produce an anti-reflection film and to evaluate the film. The results are set forth in Table 1.

TABLE 1

| polymer in high refractive index layer | particles | | | haze | $\alpha$* | $\beta$* |
|---|---|---|---|---|---|---|
| | $\gamma$* | $\delta$* | $\epsilon$* | | | |
| Ex.1 anionic crosslinked. | Ti | 65 | A | 0.3% | 2.02 | 3H |
| CE.1 crosslinked | Ti | 253 | B | 33% | —** | 3H |
| CE.2 crosslinked/surface active agent | Ti | 67 | A | 0.3% | 1.99 | 4B |
| CE.3 crosslinked/surface active agent | Ti | 205 | B | 30% | —** | B |
| Ex.2 anionic crosslinked | Ti | 43 | A | 0.1% | 1.83 | 3H |
| Ex.3 anionic crosslinked | Sn | 35 | A | 0.1% | 1.70 | 3H |
| Ex.4 anionic crosslinked | Ti | 115 | A | 0.5% | 1.65 | 3H |
| CE.4 anionic crosslinked | Ti | 215 | A | 17% | —** | 3H |
| Ex.5 anionic crosslinked | Sn | 35 | A | 0.1% | 1.71 | 3H |
| Ex.6 anionic crosslinked | Sn | 35 | A | 0.1% | 1.72 | 3H |
| Ex.7 anionic crosslinked | Ti | 43 | A | 0.2% | 2.12 | 3H |
| Ex.8 amphoteric crosslinked | Ti | 65 | A | 0.2% | 2.18 | 3H |

Remarks:
*) each of $\alpha$, $\beta$, $\gamma$, $\delta$ and $\epsilon$ is as follows.
$\alpha$: refractive index,
$\beta$: mechanical strength,
$\gamma$: material of the particles,
$\delta$: mean particle size (nm), and
$\epsilon$: grade of the dispersion.
**) It was impossible to measure the refractive indexes of Comparison Examples 1, 3 and 4.

EXAMPLE 9

Preparation of Coating Liquid for High Refractive Index Layer

To the titanium dioxide dispersion of Example 1, a mixture of dipentaerythritol pentaacrylate and dipentaerythritol hexaacrylate [DPHA, Nippon Kayaku Co., Ltd.], a photopolymerization initiator [Irgacure 907, Ciba-Geigy], a photosensitizer [Kayacure DETX, Nippon Kayaku Co., Ltd.], and methyl ethyl ketone were added. The amount of each component was adjusted so that the resultant high refractive index layer would have a refractive index of 1.75.

Formation of High Refractive Index Layer

On a polyethylene terephthalate film having 90 μm thickness, a hard coating layer was provided. The coating liquid for high refractive index layer was applied on the hard coating layer with a bar coater, and irradiated with UV light to harden. Thus, a high refractive index layer having 60 nm thickness (under dry condition) was formed.

Formation of Low Refractive Index Layer 6 g of dipentaerythritol hexaacrylate, 0.5 g of a photopolymerization initiator [Irgacure 907, Ciba-Geigy], 0.2 g of a photosensitizer [Kayacure DETX, Nippon Kayaku Co., Ltd.], and 20 g of ethyl acetate were dispersed and emulsified in 100 g of water with 1 g of sodium dodecybenzenesulfonate. The emulsified liquid and 100 g of fine particles (mean particle size: 52 nm) of copolymer of methyl methacrylate (80 weight parts)-divinylbenzene (25 weight parts) were mixed and stirred to form a coating liquid for low refractive index layer.

The coating liquid was applied on the high refractive index layer with a bar coater to form a layer having a thickness of 100 nm. After drying, the layer was heated to 100° C., and irradiated with UV light of a 12 W/cm high pressure mercury lamp for 1 minute to crosslink the polymer. The layer was cooled to room temperature, so as to form a low refractive index layer (refractive index: 1.55).

Thus, an anti-reflection film was produced.

The average reflectance (in the wavelength region of 400 to 700 nm) of the film was measured with a reflectance meter (V-550 and ARV-474, Nippon Bunko Co., Ltd.), and the haze of the film was also measured by means of a haze meter (NDH-1001DP, Nippon Denshoku Kogyo Co., Ltd.). Further, the mechanical strength was evaluated in terms of pencil hardness under a load of 1 kgw. The results are set forth in Table 2.

COMPARISON EXAMPLE 5

On the hard coating layer of Example 9, a mixture of dipentaerythritol pentaacrylate and dipentaerythritol hexaacrylate [DPHA, Nippon Kayaku Co., Ltd.] was evenly applied, and irradiated with UV light to form a layer (refractive index: 1.53) having 60 nm thickness (under dry condition).

On thus formed layer, a low refractive index layer is formed in the manner of Example 9 to produce an anti-reflection film. The film was evaluated. The results are set forth in Table 2.

COMPARISON EXAMPLE 6

Into the titanium dioxide dispersion of Comparison Example 2, a mixture of dipentaerythritol pentaacrylate and dipentaerythritol hexaacrylate [DPHA, Nippon Kayaku Co., Ltd.], a photopolymerization initiator [Irgacure 907, Ciba-Geigy], a photosensitizer [Kayacure DETX, Nippon Kayaku Co., Ltd.], and methyl ethyl ketone were added. The amount of each component was adjusted so that the resultant high refractive index layer would have a refractive index of 1.75.

Except for using thus prepared coating liquid for high refractive index layer, the procedure of Example 9 was repeated to produce an anti-reflection film and to evaluate the film. The results are set forth in Table 2.

EXAMPLE 10

The procedure of Example 9 was repeated to prepare a high refractive index layer.

On thus formed layer, a low refractive index layer (refractive index: 1.40) having 100 nm thickness of a silicon compound comprising fine voids was provided. The volume ratio of the fine voids was 6 vol. %.

The obtained anti-reflection film was evaluated in the manner of Example 9. The results are set forth in Table 2.

EXAMPLE 11

The procedure of Example 9 was repeated to prepare a high refractive index layer.

On the layer, a coating liquid for low refractive index layer is applied and dried to form a low refractive index layer having the thickness of 100 nm (refractive index: 1.40). The coating liquid contained fine particles and dipentaerythritol hexaacrylate as a binder (weight ratio of particles/binder: 84/16). The fine particles had the weight mean particle size of 30 nm, and were made of copolymer of hexafluoroisopropyl methacrylate (75 weight parts), 1,4-divinylbenzene (20 weight parts), 2-hydroxyethyl methacrylate (3 weight parts), and methacrylic acid (2 weight parts). The formed low refractive index layer had fine voids of 11 vol. % in terms of void volume.

The obtained anti-reflection film was evaluated in the manner of Example 9. The results are set forth in Table 2.

TABLE 2

| | polymer in high refractive index layer | $\alpha$* | $\beta$* | haze | $\gamma$* | $\delta$* |
|---|---|---|---|---|---|---|
| Ex.9 | anionic crosslinked | 65 | 1.55 | 0.3% | 3H | 2.3% |
| CE.5 | crosslinked | —** | 1.55 | 0.2% | 3H | 5.2% |
| CE.6 | crosslinked/surface active agent | 67 | 1.55 | 0.3% | B | 2.3% |
| Ex.10 | anionic crosslinked | 65 | 1.40 | 0.1% | 3H | 0.8% |
| Ex.11 | anionic crosslinked | 65 | 1.40 | 0.1% | 3H | 0.8% |

Remarks:
*) each of $\alpha$, $\beta$, $\gamma$ and $\delta$ is as follows.
$\alpha$: mean particle size (nm),
$\beta$: refractive index of the low refractive index layer,
$\gamma$: mechanical strength, and
$\delta$: reflectance.
**) The high refractive index layer of Comparison Example 5 does not contain fine particles.

EXAMPLE 12

Preparation of Coating Liquid for Middle Refractive Index Layer

To the titanium dioxide dispersion of Example 1, a mixture of dipentaerythritol pentaacrylate and dipentaerythritol hexaacrylate [DPHA, Nippon Kayaku Co., Ltd.], a photopolymerization initiator [Irgacure 907, Ciba-Geigy], a photosensitizer [Kayacure DETX, Nippon Kayaku Co., Ltd.], and methyl ethyl ketone were added. The amount of each component was adjusted so that the resultant middle refractive index layer would have a refractive index of 1.72.

Formation of Middle Refractive Index Layer

On a triacetylcellulose film having 90 µm thickness, a hard coating layer was provided. The coating liquid for middle refractive index layer was applied on the hard coating layer with a bar coater, and irradiated with UV light to harden. Thus, a middle refractive index layer having 75 nm thickness (under dry condition) was formed.

Preparation of Coating Liquid for High Refractive Index Layer

To the titanium dioxide dispersion of Example 1, a mixture of dipentaerythritol pentaacrylate and dipentaerythritol hexaacrylate [DPHA, Nippon Kayaku Co., Ltd.], a photopolymerization initiator [Irgacure 907, Ciba-Geigy], a photosensitizer [Kayacure DETX, Nippon Kayaku Co., Ltd.], and methyl ethyl ketone were added. The amount of each component was adjusted so that the resultant high refractive index layer would have a refractive index of 2.20.

Formation of High Refractive Index Layer

The coating liquid for high refractive index layer was applied on the middle refractive index layer with a bar coater, and irradiated with UV light to harden. Thus, a high refractive index layer having 80 nm thickness (under dry condition) was formed.

Formation of Low Refractive Index Layer

The procedure of Example 9 was repeated to prepare a low refractive index layer having 80 nm thickness on the high refractive index layer. Thus, an anti-reflection film was produced.

The average reflectance, the haze, and the mechanical strength of the produced film were evaluated in the manner of Example 9. The results are set forth in Table 3.

COMPARISON EXAMPLE 7

Preparation of Coating Liquid for Middle Refractive Index Layer

To the titanium dioxide dispersion of Comparison Example 2, a mixture of dipentaerythritol pentaacrylate and dipentaerythritol hexaacrylate [DPHA, Nippon Kayaku Co., Ltd.], a photopolymerization initiator [Irgacure 907, Ciba-Geigy], a photosensitizer [Kayacure DETX, Nippon Kayaku Co., Ltd.], and methyl ethyl ketone were added. The amount of each component was adjusted so that the resultant middle refractive index layer would have a refractive index of 1.72.

Formation of Middle Refractive Index Layer

On a triacetylcellulose film having 90 $\mu$m thickness, a hard coating layer was provided. The coating liquid for middle refractive index layer was applied on the hard coating layer with a bar coater, and irradiated with UV light to harden. Thus, a middle refractive index layer having 75 nm thickness (after dryness) was formed.

Preparation of Coating Liquid for High Refractive Index Layer

To the titanium dioxide dispersion of Comparison Example 2, a mixture of dipentaerythritol pentaacrylate and dipentaerythritol hexaacrylate [DPHA, Nippon Kayaku Co., Ltd.], a photopolymerization initiator [Irgacure 907, Ciba-Geigy], a photosensitizer [Kayacure DETX, Nippon Kayaku Co., Ltd.], and methyl ethyl ketone were added. The amount of each component was adjusted so that the resultant high refractive index layer would have a refractive index of 2.20.

Formation of High Refractive Index Layer

The coating liquid for high refractive index layer was applied on the middle refractive index layer with a bar coater, and irradiated with UV light to harden. Thus, a high refractive index layer having 115 nm thickness (after dryness) was formed.

Formation of Low Refractive Index Layer

The procedure of Example 9 was repeated to prepare a low refractive index layer having 80 nm thickness on the high refractive index layer. Thus, an anti-reflection film was produced.

The average reflectance, the haze, and the mechanical strength of the produced film were evaluated in the manner of Example 9. The results are set forth in Table 3.

EXAMPLE 13

Preparation of Coating Liquid for Middle Refractive Index Layer

To the tin oxide dispersion of Example 3, a mixture of dipentaerythritol pentaacrylate and dipentaerythritol hexaacrylate [DPHA, Nippon Kayaku Co., Ltd.], a photopolymerization initiator [Irgacure 907, Ciba-Geigy], a photosensitizer [Kayacure DETX, Nippon Kayaku Co., Ltd.], and methyl ethyl ketone were added. The amount of each component was adjusted so that the resultant middle refractive index layer would have a refractive index of 1.72.

Formation of Middle Refractive Index Layer

On a triacetylcellulose film having 90 $\mu$thickness, a hard coating layer was provided. The coating liquid for middle refractive index layer was applied on the hard coating layer with a bar coater, and irradiated with UV light to harden. Thus, a middle refractive index layer having 75 nm thickness (under dry condition) was formed.

Preparation of Coating Liquid for High Refractive Index Layer

To the titanium dioxide dispersion of Example 8, a mixture of dipentaerythritol pentaacrylate and dipentaerythritol hexaacrylate [DPHA, Nippon Kayaku Co., Ltd.], a photopolymerization initiator [Irgacure 907, Ciba-Geigy], a photosensitizer [Kayacure DETX, Nippon Kayaku Co., Ltd.], and methyl ethyl ketone were added. The amount of each component was adjusted so that the resultant high refractive index layer would have a refractive index of 2.20.

Formation of High Refractive Index Layer

The coating liquid for high refractive index layer was applied on the middle refractive index layer with a bar coater, and irradiated with UV light to harden. Thus, a high refractive index layer having 115 nm thickness (under dry condition) was formed.

Formation of Low Refractive Index Layer

The procedure of Example 10 was repeated to form a low refractive index layer (refractive index: 1.40) having 80 nm thickness on the high refractive index layer. The formed layer had fine voids of 6 vol. % in terms of void volume.

Thus, an anti-reflection film was produced.

The average reflectance, the haze, and the mechanical strength of the produced film were evaluated in the manner of Example 9. The results are set forth in Table 3.

EXAMPLE 14

The procedure of Example 13 was repeated to form a middle refractive index layer and a high refractive index layer.

The procedure of Example 11 was repeated to prepare a low refractive index layer (refractive index: 1.40) having 80 nm thickness on the high refractive index layer. The prepare layer had fine voids of 11 vol. % in terms of void volume.

Thus, an anti-reflection film was produced.

The average reflectance, the haze, and the mechanical strength of the produced film were evaluated in the manner of Example 9. The results are set forth in Table 3.

EXAMPLE 15

Preparation of Coating Liquid for Middle Refractive Index Layer

Into the titanium dioxide dispersion of Example 8, a mixture of dipentaerythritol pentaacrylate and dipentaerythritol hexaacrylate [DPHA, Nippon Kayaku Co., Ltd.], a photopolymerization initiator [Irgacure 907, Ciba-Geigy], a photosensitizer [Kayacure DETX, Nippon Kayaku Co., Ltd.], and methyl ethyl ketone were added. The amount of each component was adjusted so that the resultant middle refractive index layer would have a refractive index of 1.72.

Formation of Middle Refractive Index Layer

On a triacetylcellulose film having 90 μm thickness, a hard coating layer was provided. The coating liquid for middle refractive index layer was applied on the hard coating layer with a bar coater, and irradiated with UV light to harden. Thus, a middle refractive index layer having 75 nm thickness (under dry condition) was formed.

Preparation of Coating Liquid for High Refractive Index Layer

To the titanium dioxide dispersion of Example 8, a mixture of dipentaerythritol pentaacrylate and dipentaerythritol hexaacrylate [DPHA, Nippon Kayaku Co., Ltd.], a photopolymerization initiator [Irgacure 907, Ciba-Geigy], a photosensitizer [Kayacure DETX, Nippon Kayaku Co., Ltd.], and methyl ethyl ketone were added. The amount of each component was adjusted so that the resultant high refractive index layer would have a refractive index of 2.20.

Formation of High Refractive Index Layer

The coating liquid for high refractive index layer was applied on the middle refractive index layer with a bar coater, and irradiated with UV light to harden. Thus, a high refractive index layer having 115 nm thickness (under dry condition) was formed.

Formation of Low Refractive Index Layer

The procedure of Example 11 was repeated to form a low refractive index layer (refractive index: 1.40) having 80 nm thickness on the high refractive index layer. The formed layer had fine voids of 11 vol. % in terms of void volume.

Thus, an anti-reflection film was produced.

The average reflectance, the haze, and the mechanical strength of the produced film were evaluated in the manner of Example 9. The results are set forth in Table 3.

TABLE 3

| polymer in high refractive index layer | α* | β* | haze | γ* | δ* |
|---|---|---|---|---|---|
| Ex.12 anionic crosslinked | 65 | 1.55 | 0.5% | 3H | 1.1% |
| CE.7 crosslinked/surface active agent | 67 | 1.55 | 0.5% | B | 0.4% |
| Ex.13 anionic crosslinked | 65 | 1.40 | 0.5% | 3H | 0.3% |

TABLE 3-continued

| polymer in high refractive index layer | α* | β* | haze | γ* | δ* |
|---|---|---|---|---|---|
| Ex.14 anionic crosslinked | 65 | 1.40 | 0.5% | 3H | 0.3% |
| Ex.15 anionic crosslinked | 65 | 1.40 | 0.5% | 3H | 0.3% |

Remarks:
*) each of α, β, γ and δ is as follows.
α: mean particle size (nm),
β: refractive index of the low refractive index layer,
γ: mechanical strength, and
δ: reflectance.

SYNTHESIS EXAMPLE 1

Surface Treatment of Inorganic Fine Particles

In a three neck flask of 500 ml having a reflux condenser, a thermometer and a stirrer, 300 ml of distilled water and 0.57 g of 70 wt. % aqueous dioctyl sodium sulfosuccinate (surface active agent) solution were placed and stirred to prepare a mixture. To the mixture, 90.0 g of 21.1 wt. % colloidal dispersion of magnesium fluoride (particle size: 30.5 nm) was slowly added. The pH of the liquid was adjusted to 7.5 using 2N sulfuric acid. After heating to 80° C. under nitrogen gas atmosphere, 1.0 g of 3-methacryloyloxypopyltrimethoxysilane was added and stirred for 4 hours. Thus, the magnesium fluoride particles were subjected to surface treatment.

Formation of Polymer Shell

To the surface treated magnesium fluoride particles, an aqueous solution (polymerization initiator solution) prepared by dissolving 0.128 g of potassium persulfate in 8 ml of distilled water was added. Immediately, 4.5 g of hexafluoroisopropyl methacrylate (monomer) was dropwise added for 3 hours, and then the polymerization initiator solution was again added. The reaction mixture was stirred at 80° C. for 3 hours to complete polymerization.

The liquid was cooled to room temperature, and filtered to prepare 415 g of core-shell fine particle dispersion (yield: 98%) having a solid content of 6.0 wt. % and a mean particle size of 40.2 nm.

SYNTHESIS EXAMPLE 2

Surface Treatment of Inorganic Fine Particles

In a four neck flask of 300 ml having a reflux condenser, a thermometer and a stirrer, 5 g of sodium dodecylsulfate, 300 g of colloidal silica [ST-ZL, Nissan Kagaku Co., Ltd.; mean particle size: 72 nm, solid content: 30 wt. %], and 74 ml of ion exchanged water were placed. The pH of the mixture was adjusted to 7.5 with 2N sulfuric acid, and stirred. After heating to 60° C. under nitrogen gas atmosphere, 10 g of 3-methacryloyloxypopyltrimethoxysilane was added and stirred for 4 hours. Thus, the silica particles were subjected to surface treatment.

Formation of Polymer Shell

To the surface treated silica particles, 0.5 g of potassium persulfate and 0.2 g of sodium bisulfite were added. Further, a mixture of 54 g of hexafluoroisopropyl methacrylate, 4.8 g of glycidyl methacrylate, and 1.2 g of acrylic acid was dropwise added for 3 hours while the reaction temperature was kept at 60–70° C. Even after the addition was complete, the liquid was stirred for 2 hours while the temperature was still kept in the same level. The reaction mixture was cooled to room temperature, dialyzed for 3 days with a dialyzer having the fractional molecular weight of 10,000, and filtered to give 757 g of core-shell fine particle dispersion (yield: 96%) having the solid content of 20.3 wt. % and the mean particle size of 81.3 nm.

SYNTHESIS EXAMPLES 3–7

By the emulsion polymerization process similar to Synthesis examples 1 and 2, shells of the following polymers were formed around the particles to synthesize the core-shell fine particles set forth Table 4.

Synthesis Example 1: polyhexafluoroisopropyl methacrylate,

Synthesis Example 2: copolymer of hexafluoroisopropyl methacrylate (90 weight parts)/glycidyl methacrylate (8 weight parts)/acrylic acid (2 weight parts), Synthesis Example 3: copolymer of hexafluoroisopropyl methacrylate (90 weight parts)/glycidyl methacrylate (10 weight parts), Synthesis Example 4: copolymer of 1H,1H-pentadecafluorooctyl acrylate (95 weight parts)/2-hydroxyethyl methacrylate (5 weight parts), Synthesis Example 5: copolymer of hexafluoroisopropyl α-fluoroacrylate (90 weight parts)/2-hydroxyethyl acrylate (10 weight parts), Synthesis Example 6: copolymer of trifluoroethyl acrylate (80 weight parts)/glycidyl methacrylate (20 weight parts), and Synthesis Example 7: copolymer of hexafluoroisopropyl methacrylate (90 weight parts)/allyl methacrylate (10 weight parts).

TABLE 4

| | α* | β* | γ* | δ* | ε* | ζ* |
|---|---|---|---|---|---|---|
| Syn.Ex.1 | $MgF_2$ | 30.5 | 81/19 | 6.0 | 40.2 | 59.2 |
| Syn.Ex.2 | $SiO_2$ | 72.0 | 60/40 | 20.3 | 81.3 | 18.6 |
| Syn.Ex.3 | $MgF_2$ | 30.5 | 70/30 | 8.2 | 53.9 | 56.7 |
| Syn.Ex.4 | $SiO_2$ | 72.0 | 50/50 | 12.6 | 92.0 | 29.8 |
| Syn.Ex.5 | $CaF_2$ | 55.4 | 90/10 | 11.3 | 61.4 | 48.8 |
| Syn.Ex.6 | $CaF_2$ | 55.4 | 82/18 | 6.2 | 67.9 | 45.2 |
| Syn.Ex.7 | $MgF_2$ | 123.0 | 76/24 | 3.9 | 139.0 | 58.8 |

Remarks:
*) each of α, β, γ, δ, ε and ζ is as follows.
α: core compound,
β: core particle size (nm),
γ: weight ratio of core/shell,
δ: solid content (wt. %),
ε: mean particle size (nm), and
ζ: content of fluorine (wt. %).

EXAMPLE 16

90 weight parts of the fine particles prepared in Synthesis Example 1 and 10 weight parts of polymethyl methacrylate latex were mixed to prepare a coating dispersion for low refractive index layer.

The liquid was applied on a triacetylcellulose film with a spin coater, and dried at 90° C. for 90 minutes to form a low refractive index layer having 100 nm thickness. Thus, an anti-reflection film was produced.

The refractive index, the void ratio, the visible reflectance (average reflectance in the wavelength region of 400 to 800 nm), and the surface mechanical strength of the produced film were measured.

The refractive index of the layer was measured, and independently the theoretical one was calculated in consideration of the components of the layer. From the difference between the measured refractive index and the theoretical value, the void ratio was evaluated. On the other hand, the film was rubbed with a finger, tissue paper or a rubber eraser, and observed by sight to evaluate the surface mechanical strength. According to the observation, the grade of the surface mechanical strength was determined. The grade "A" means that the film was not damaged with any of the above, and tha those of "B", "C" and "D" mean that the film was damaged with a rubber eraser, tissue paper and a finger, respectively. The results are set forth in Table 5.

EXAMPLES 17–25 AND SYNTHESIS EXAMPLES 8–11

The procedure of Example 1 was repeated except that the compositions of fine particles and polymer binders were changed as shown in Table 5, to produce anti-reflection films. The films were evaluated in the manner of Example 16, and the results are set forth in Table 5.

TABLE 5

| | particles | | binder | | | | | |
|---|---|---|---|---|---|---|---|---|
| | ε* | ζ* | η* | θ* | α* | β* | γ* | δ* |
| Ex.16 | Syn.Ex.1 | 90 | BP3** | 10 | 1.33 | 0.5 | A | 18% |
| Ex.17 | Syn.Ex.1 | 85 | BP1** | 15 | 1.32 | 0.3 | A | 14% |
| Ex.18 | Syn.Ex.3 | 100 | — | 0 | 1.31 | 0.3 | A | 21% |
| Ex.19 | Syn.Ex.3 | 90 | BP1** | 10 | 1.31 | 0.3 | A | 17% |
| Ex.20 | Syn.Ex.3 | 80 | BP3** | 20 | 1.32 | 0.5 | A | 11% |
| Ex.21 | Syn.Ex.2 | 75 | BP2** | 25 | 1.34 | 0.6 | A | 7% |
| Ex.22 | Syn.Ex.4 | 75 | BP2** | 25 | 1.33 | 0.4 | A | 5% |
| Ex.23 | Syn.Ex.5 | 75 | BP2** | 25 | 1.32 | 0.2 | A | 12% |
| Ex.24 | Syn.Ex.6 | 75 | BP2** | 25 | 1.33 | 0.4 | A | 9% |
| Ex.25 | Syn.Ex.7 | 75 | BP2** | 25 | 1.31 | 0.3 | A | 9% |
| CE.8 | NP-1*** | 75 | BP1** | 25 | 1.45 | 3.2 | C | 1% |
| CE.9 | NP-2*** | 80 | BP2** | 20 | 1.36 | 0.7 | C | 10% |
| CE.10 | NP-2*** | 75 | BP1** | 25 | 1.34 | 0.5 | B | 9% |
| CE.11 | None | — | BP1** | 100 | 1.38 | 2.4 | D | 0% |

Remarks:
*) each of α, β, γ, δ, ε, ζ, η and θ is as follows.
α: refractive index of the low refractive index layer,
β: surface reflectance,
γ: grade of mechanical strength,
δ: void ratio,
ε: material of particles,
ζ: content of particles (wt. %),
η: material of binders, and
θ: content of binders (wt. %).
**) each of BP1, BP2 and BP3 is as follows.
BP1: polyhexafluoroisopropyl methacrylate latex,
BP2: copolymer latex of hexafluoroisopropyl methacrylate (9 weight parts)/divinylbenzene (9 weight parts), and
BP3: polymethyl methacrylate latex.
***) each of NP-1 and NP-2 is as follows.
NP-1: fine particles (mean particle size: 52 nm) of copolymer of methyl methacrylate (80 weight parts)/divinyl benzene (25 weight parts), and
NP-2: fine particles (mean particle size: 61 nm) consisting of copolymer core (70 wt. %) of hexafluoroisopropyl methacrylate (80 weight parts)/divinyl benzene(20 weights parts) and copolymer shell (30 wt. %) of hexafluoroisopropyl methacrylate (90 weight parts)/glycidyl methacrylate (10 weight parts).

EXAMPLE 26

Formation of Hard Coating Layer

Dipentaerythritol hexaacrylate, a photopolymerization initiator [Irgacure 907, Ciba-Geigy], and a photosensitizer [Kayacure DETX, Nippon Kayaku Co., Ltd.] were dissolved in toluene in amounts of 5 wt. %, 0.5 wt. % and 0.2 wt. %, respectively. The prepared solution was applied on a triacetylcellulose film having 90 μm thickness by means of a wire bar, and dried to form a layer having a thickness of 8 μm. The formed layer was heated to 100° C., and irradiated with UV light of a 12 W/cm high pressure mercury lamp for 1 minute to crosslink the polymer. The layer was then cooled to room temperature.

Formation of High Refractive Index Layer 100 g of copolymer latex (mean particles size: 71 nm, solid content: 12.5 wt. %) of n-butyl methacrylate (80 weight parts)/methacrylic acid (20 weight parts) and 25 g tin oxide particles (available from Ishihara Sangyo Co., Ltd.) were mixed. Independently, 6 g of dipentaerythritol hexaacrylate, 0.5 g of a photopolymerization initiator [Irgacure 907, Ciba-Geigy], 0.2 g of a photosensitizer [Kayacure DETX, Nippon Kayaku Co., Ltd.], and 20 g of ethyl acetate were dispersed and emulsified in 100 g of water containing 1 g of sodium dodecybenzenesulfonate. Thus prepared latex and the emulsified liquid were mixed to prepare a coating liquid for high refractive index layer. The prepared liquid was applied on the hard coating layer by means of a wire bar, to form a high refractive index layer having the thickness of 0.16 μm. After drying, the formed layer was heated to 100° C., and irradiated with UV light of a 12 W/cm high pressure mercury lamp for 1 minute to crosslink the polymer. The layer was then cooled to room temperature.

Formation of Low Refractive Index Layer 6 g of dipentaerythritol hexaacrylate, 0.5 g of a photopolymerization initiator [Irgacure 907, Ciba-Geigy], 0.2 g of a photosensitizer [Kayacure DETX, Nippon Kayaku Co., Ltd.], and 20 g of ethyl acetate were dispersed and emulsified in 100 g of water with 1 g of sodium dodecybenzenesulfonate. The emulsified liquid and 100 g of the fine particles prepared in Synthesis Example 1 were mixed and stirred to prepare a coating liquid for low refractive index layer.

The prepared liquid was applied on the hard refractive index layer by means of a wire bar, to form a low refractive index layer having the thickness of 0.10 μm. After drying, the formed layer was heated to 100° C., and irradiated with UV light of a 12 W/cm high pressure mercury lamp for 1 minute to crosslink the polymer. The layer was then cooled to room temperature.

Thus, an anti-reflection film was produced.

The visible reflectance and the surface mechanical strength of the produced film were evaluated in the manner of Example 16, and found 0.3% and grade "A", respectively.

EXAMPLES 27–31 AND COMPARISON EXAMPLES 12 AND 13

The procedure of Example 26 was repeated except that the polymer in the high refractive index layer and the fine particles in low refractive index were changed as shown in Table 6, to produce anti-reflection films. The concentration of each coating liquid was adjusted so that the liquid might have the same solid content as that in Example 26. The visible reflectance and the surface mechanical strength of each produced film were evaluated, and the results are set forth in Table 6.

TABLE 6

| | high r. layer | | low r. layer | surface | strength |
|---|---|---|---|---|---|
| | polymer | r.index | fine particles | reflect. | grade |
| Ex.26 | HP1* | 1.55 | Syn.Ex.1 | 0.3% | A |
| Ex.27 | HP2* | 1.57 | Syn.Ex.3 | 0.3% | A |
| Ex.28 | HP3* | 1.59 | Syn.Ex.3 | 0.2% | A |
| Ex.29 | HP2* | 1.57 | Syn.Ex.4 | 0.4% | A |
| Ex.30 | HP1* | 1.55 | Syn.Ex.5 | 0.2% | A |
| Ex.31 | HP3* | 1.59 | Syn.Ex.7 | 0.3% | A |
| CE.12 | HP1* | 1.55 | NP-1** | 4.2% | C |
| CE.13 | HP1* | 1.55 | NP-2** | 0.3% | C |

Remarks:
*) each of HP1, HP2 and HP3 is as follows.
HP1: copolymer of n-butyl methacrylate (80 weight parts)/methacrylic acid (20 weight parts),
HP2: copolymer of methyl methacrylate (65 weight parts)/ethyl methacrylate (25 weight parts)/glycidyl methacrylate (10 weight parts), and
HP3: copolymer of benzyl methacrylate (50 weight parts)/methyl methacrylate (25 weight parts)/allyl methacrylate (20 weight parts)/methacrylic acid (5 weight parts).
**) each of NP-1 and NP-2 is as follows.
NP-1: fine particles (mean particle size: 52 nm) of copolymer of methyl methacrylate (80 weight parts)/divinyl benzene (25 weight parts), and
NP-2: fine particles (mean particle size: 61 nm) consisting of copolymer core (70 wt. %) of hexafluoroisopropyl methacrylate (80 weight parts)/divinyl benzene (20 weights parts) and copolymer shell (30 wt. %) of hexafluoroisopropyl methacrylate (90 weight parts)/glycidyl methacrylate (10 weight parts).

EXAMPLE 32

The anti-reflection film prepared in Example 27 was fixed on the liquid crystal display screen of personal computer (PC9821NS/340W, Nippon Electric Co., Ltd.). The image displayed on the screen equipped with the film was observed to confirm that surrounding scene was scarcely reflected in the screen, and that the film gave excellent viewability.

EXAMPLE 33

The anti-reflection film prepared in Example 28 was fixed on the liquid crystal display screen of personal computer (PC9821NS/340W, Nippon Electric Co., Ltd.). The image displayed on the screen equipped with the film was observed to confirm that surrounding scene was scarcely reflected in the screen, and that the film gave excellent viewability.

EXAMPLE 34

The anti-reflection film prepared in Example 30 was fixed on the liquid crystal display screen of personal computer (PC9821NS/340W, Nippon Electric Co., Ltd.). The image displayed on the screen equipped with the film was observed to confirm that surrounding scene was scarcely reflected in the screen, and that the film gave excellent viewability.

COMPARISON EXAMPLE 14

The anti-reflection film prepared in Comparison Example 12 was fixed on the liquid crystal display screen of personal computer (PC9821NS/340W, Nippon Electric Co., Ltd.). The image displayed on the screen equipped with the film was observed to confirm that surrounding scene was considerably reflected in the screen, and that the film gave poor viewability as compared with those of the films of Examples 32 to 34.

COMPARISON EXAMPLE 15

The anti-reflection film prepared in Comparison Example 13 was fixed on the liquid crystal display screen of personal computer (PC9821NS/340W, Nippon Electric Co., Ltd.). The image displayed on the screen equipped with the film was observed to confirm that surrounding scene was considerably reflected in the screen, and that the film gave poor viewability as compared with those of the films of Examples 32 to 34.

EXAMPLE 35

Formation of Hard Coating Layer 125 g of a mixture of dipentaerythritol pentaacrylate and dipentaerythritol hexaacrylate [DPHA, Nippon Kayaku Co., Ltd.] and 125 g of urethane acrylate oligomer [UV-6300B, Nippon Goseikagaku Kogyo Co., Ltd.] were dissolved in 439 g of industrial denatured ethanol. To the obtained solution, a solution prepared by dissolving 7.5 g of a photopolymerization initiator [Irgacure 907, Ciba-Geigy] and 5.0 g of a photosensitizer [Kayacure DETX, Nippon Kayaku Co., Ltd.] in 49 g of methyl ethyl ketone was added. After stirring, the mixture was filtered through 1 $\mu$m mesh to prepare a coating liquid for hard coating layer.

On a triacetylcellulose film [TAC-TD80U, Fuji Photo Film Co., Ltd.] having 80 $\mu$m thickness, a gelatin undercoating layer was provided. The coating liquid for hard coating layer was applied on the undercoating layer with a bar coater, dried at 120° C., and irradiated with UV light to harden. Thus, a hard coating layer having 7.5 $\mu$m thickness was formed.

Preparation of Coating Liquid for Low Refractive Index Layer 200 g of methanol dispersion of fine silica particles [R507, Nissan Kagaku Co., Ltd.], 10 g of silane coupling agent [KBN-803, Shin-Etsu Silicon Co., Ltd.] and 2 g of 0.1 N hydrochloric acid were mixed and stirred at room temperature for 5 hours, and then stored at room temperature for about 6 days. Thus, a dispersion of fine silica particles subjected to silane treatment was prepared.

To 149 g of the dispersion, 789 g of isopropyl alcohol and 450 g of methanol were added. To the obtained mixture, a solution prepared by dissolving 3.21 g of a photopolymerization initiator [Irgacure 907, Ciba-Geigy] and 1.605 g of a photosensitizer [Kayacure DETX, Nippon Kayaku Co., Ltd.] in 31.62 g of isopropyl alcohol was added. Further, a solution prepared by dissolving 2.17 g of a mixture of dipentaerythritol pentaacrylate and dipentaerythritol hexaacrylate [DPHA, Nippon Kayaku Co., Ltd.] in 78.13 g of isopropyl alcohol was added. The thus prepared mixture was stirred at room temperature for 20 minutes, and filtered through 1 $\mu$m mesh to prepare a coating liquid for low refractive index layer.

Production of Anti-reflection Film

The coating liquid for low refractive index layer was applied on the hard coating layer with a bar coater, dried at 120° C., and irradiated with UV light to form a low refractive index layer (thickness: 0.1 $\mu$m). Thus, an anti-reflection film was produced.

The average reflectance in the wavelength region of 450 to 650 nm of the film was measured, and the surface mechanical strength was evaluated in terms of pencil hardness. The results are set forth in Table 7.

EXAMPLE 36

On a polyethylene terephthalate film having 100 $\mu$m thickness, a gelatin undercoating layer was provided. The coating liquid for hard coating layer of Example 35 was applied on the undercoating layer with a bar coater, dried at 120° C., and irradiated with UV light to harden. Thus, a hard coating layer having 7.5 $\mu$m thickness was formed.

The procedure of Example 21 was repeated to form a low refractive index layer on the hard coating layer, to produce an anti-reflection film.

The average reflectance in the wavelength region of 450 to 650 nm of the film was measured, and the surface mechanical strength was evaluated in terms of pencil hardness. The results are set forth in Table 7.

EXAMPLE 37

The surface of a syndiotactic polystyrene film having 100 $\mu$m thickness was subjected to glow discharge treatment. The coating liquid for hard coating layer of Example 35 was applied on the thus treated film with a bar coater, dried at 120° C., and irradiated with UV light to harden. Thus, a hard coating layer having 7.5 $\mu$m thickness was formed.

The procedure of Example 35 was repeated to form a low refractive index layer on the hard coating layer, to produce an anti-reflection film.

The average reflectance in the wavelength region of 450 to 650 nm of the film was measured, and the surface mechanical strength was evaluated in terms of pencil hardness. The results are set forth in Table 7.

TABLE 7

| | transparent support | | void | | strength |
|---|---|---|---|---|---|
| | material | re.index | ratio | reflect. | grade |
| Ex.35 | triacetylcellulose | 1.48 | 14% | 1.5% | 2H |
| Ex.36 | polyethylene terephthalate | 1.66 | 14% | 1.3% | 2H |
| Ex.37 | polystyrene | 1.58 | 14% | 1.4% | 2H |

EXAMPLE 38

Preparation of Titanium Dioxide Dispersion 30 weight parts of titanium dioxide [weight mean particle size of primary particles: 50 nm, refractive index: 2.70], 3 weight parts of the anionic monomer (1) in Example 1, 3 weight parts of the anionic monomer (2) in Example 1, 1 weight part of the cationic monomer in Example 8, and 63 weight parts of methyl ethyl ketone were mixed by means of a sand grinder to prepare a dispersion of titanium dioxide.

Preparation of Coating Liquid for Middle Refractive Index Layer 0.18 g of a photopolymerization initiator [Irgacure 907, Ciba-Geigy] and 0.059 g of a photosensitizer [Kayacure DETX, Nippon Kayaku Co., Ltd.] were dissolved in 172 g of cyclohexanone and 43 g of methyl ethyl ketone. To the obtained solution, a mixture of 15.8 g of the titanium dioxide dispersion and 3.1 g of a mixture of dipentaerythritol pentaacrylate and dipentaerythritol hexaacrylate [DPHA, Nippon Kayaku Co., Ltd.] were added and stirred at room temperature for 30 minutes. The liquid was filtered through 1 $\mu$m mesh to prepare a coating liquid for middle refractive index layer.

Preparation of Coating Liquid for High Refractive Index Layer 0.085 g of a photopolymerization initiator [Irgacure 907, Ciba-Geigy] and 0.028 g of a photosensitizer [Kayacure DETX, Nippon Kayaku Co., Ltd.] were dissolved in 183 g of cyclohexanone and 46 g of methyl ethyl ketone. To the obtained solution, a mixture of 17.9 g of the titanium dioxide dispersion and 1.0 g of a mixture of dipentaerythritol pentaacrylate and dipentaerythritol hexaacrylate [DPHA, Nippon Kayaku Co., Ltd.] were added and stirred at room temperature for 30 minutes. The liquid was filtered through 1 μmesh to prepare a coating liquid for high refractive index layer.

Production of Anti-reflection Film

The coating liquid for middle refractive index layer was applied on the hard coating layer formed in Example 35 with a bar coater, dried at 120° C., and irradiated with UV light to form a middle refractive index layer (thickness: 0.081 μm).

The coating liquid for high refractive index layer was applied on the middle refractive index layer with a bar coater, dried at 120° C., and irradiated with UV light to form a high refractive index layer (thickness: 0.053 μm).

The coating liquid for low refractive index layer of Example 35 was applied on the high refractive index layer with a bar coater, dried at 120° C., and irradiated with UV light to form a low refractive index layer (thickness: 0.092 μm).

Thus, an anti-reflection film was produced.

The average reflectance in the wavelength region of 450 to 650 nm of the film was measured, and the surface mechanical strength was evaluated in terms of pencil grades. Further, the contact angle of the surface was also measured to estimate whether the film is easily stained with finger prints. The results are set forth in Table 8.

EXAMPLE 39

The procedure of Example 38 was repeated except that the thickness of the low refractive index layer was set at 0.072 μm, to provide middle, high and low refractive index layers on the hard coating layer. A solution of crosslinkable polymer containing fluorine was applied on the low refractive index layer, and heated at 120° C. to crosslink the polymer. Thus, a protective layer having the thickness of 0.02 μm was formed to produce an anti-reflection film.

The average reflectance in the wavelength region of 450 to 650 nm of the film was measured, and the surface mechanical strength was evaluated in terms of pencil grades. Further, the contact angle of the surface was also measured to estimate whether the film is easily stained with finger prints. The results are set forth in Table 8.

TABLE 8

|  | protective layer | reflect. | strength grade | contact angle |
|---|---|---|---|---|
| Ex.38 | not provided | 0.35% | 2H | 106° |
| Ex.39 | provided | 0.36% | 2H | 28° |

What is claimed is:

1. An anti-reflection film comprising a high refractive index layer having a refractive index of 1.65 to 2.40 and a low refractive index layer having a refractive index of 1.20 to 1.55, wherein the high refractive index layer contains inorganic fine particles having a mean particle size of 1 to 200 nm in an amount of 5 to 65 vol. % and a crosslinked polymer comprising a phosphoric acid group or a sulfonic acid group as an anionic group in an amount of 35 to 95 vol. %.

2. The anti-reflection film of claim 1, wherein the polymer having the anionic group in the high refractive index layer further comprises an amino group or an ammonium group.

3. The anti-reflection film of claim 1, wherein the inorganic fine particles in the high refractive index layer have an average refractive index of 1.80 to 2.80.

4. The anti-reflection film of claim 1, wherein the high refractive index layer is formed by applying a coating liquid, and the polymer having the anionic group is formed by polymerization reaction during or after the application.

5. The anti-reflection film of claim 1, wherein the low refractive index layer contains inorganic fine particles having a mean particle size of 0.5 to 200 nm in an amount of 50 to 95 wt. % and a polymer in an amount of 5 to 50 wt. %, and two or more of said particles are piled up to form micro voids among the particles.

6. The anti-reflection film of claim 5, wherein the void volume in the low refractive index layer is in the range of 3 to 50 vol. %.

7. The anti-reflection film of claim 5, wherein the inorganic fine particles in the low refractive index layer are coated with a shell made of a polymer.

8. The anti-reflection film of claim 5, wherein the micro voids in the low refractive index layer are enclosed with the inorganic particles and the polymer.

9. A display device having, on its display screen, an anti-reflection film which comprises a high refractive index layer having a refractive index of 1.65 to 2.40 and a low refractive index layer having a refractive index of 1.20 to 1.55, wherein the high refractive index layer contains inorganic fine particles having a mean particle size of 1 to 200 nm in an amount of 5 to 65 vol. % and a crosslinked polymer comprising a phosphoric acid group or a sulfonic acid group as an anionic group in an amount of 35 to 95 vol. %.

* * * * *